(12) United States Patent
Wang

(10) Patent No.: US 12,534,269 B2
(45) Date of Patent: Jan. 27, 2026

(54) HANDLE HAVING ENGAGING PORTION

(71) Applicant: Ting-Jui Wang, New Taipei (TW)

(72) Inventor: Ting-Jui Wang, New Taipei (TW)

(*) Notice: Subject to any disclaimer, the term of this patent is extended or adjusted under 35 U.S.C. 154(b) by 82 days.

(21) Appl. No.: 18/512,066

(22) Filed: Nov. 17, 2023

(65) Prior Publication Data

US 2024/0083635 A1    Mar. 14, 2024

Related U.S. Application Data

(63) Continuation of application No. 17/553,829, filed on Dec. 17, 2021, now abandoned.

(51) Int. Cl.
*A45C 13/22* (2006.01)
*B65D 25/28* (2006.01)

(52) U.S. Cl.
CPC .................. *B65D 25/2802* (2013.01)

(58) Field of Classification Search
CPC . A47B 95/02; A47B 95/023; A47B 2095/023; A47B 2095/024; E05B 1/00; E05B 1/0015; E05B 1/0053; E05B 85/10; E05B 79/06; F25D 23/02; F25D 23/028; F25D 2400/06; F16B 33/00; F16B 37/16; B65D 25/28; B65D 25/2802; B65D 25/2805; B65D 25/2867; E05D 25/2885; E05D 25/2888; E05D 25/2897
See application file for complete search history.

(56) References Cited

U.S. PATENT DOCUMENTS

| | | | | |
|---|---|---|---|---|
| 2,806,564 A | * | 9/1957 | Lasinski | A45C 13/26 16/410 |
| 2,867,306 A | * | 1/1959 | Lasinski | A45C 13/26 190/115 |
| 3,842,709 A | * | 10/1974 | Fuqua | F16B 21/086 248/27.3 |
| 5,158,331 A | * | 10/1992 | Wesselski | F16B 2/185 294/94 |
| 5,519,923 A | * | 5/1996 | Rojdev | A61G 17/041 27/27 |
| 5,590,921 A | * | 1/1997 | Holtman | E05C 5/00 292/257 |
| 5,887,927 A | * | 3/1999 | Kurek, III | H05K 5/023 16/415 |
| 5,961,194 A | * | 10/1999 | Shaw | H05K 5/023 312/352 |
| 7,429,143 B2 | * | 9/2008 | Tyski | F16B 21/09 24/104 |
| 8,555,466 B1 | * | 10/2013 | Wang | B25G 3/18 16/DIG. 24 |

(Continued)

FOREIGN PATENT DOCUMENTS

EP          480534 A   *  4/1992

*Primary Examiner* — Chuck Y Mah

(57) ABSTRACT

A handle with an engaging portion is introduced. The handle includes a body portion and a second engaging portion. The second engaging portion is disposed at one end of the body portion. The second engaging portion has a neck portion adapted to be inserted into, fitted to or snap-engaged with an object. Thus, the handle is mounted on the object in order to be in use and dismounted from the object when not in use. Therefore, the handle is not only easy to operate and use but is also not susceptible to collisions.

4 Claims, 27 Drawing Sheets

(56) References Cited

U.S. PATENT DOCUMENTS

| | | | |
|---|---|---|---|
| 2008/0251305 A1* | 10/2008 | Shin | E05B 5/003 |
| | | | 180/69.21 |
| 2016/0003271 A1* | 1/2016 | Wang | F16B 17/006 |
| | | | 403/322.4 |
| 2017/0074303 A1* | 3/2017 | Bowers | F16B 5/10 |
| 2019/0376537 A1* | 12/2019 | Wang | F16B 2/18 |

* cited by examiner (a)

(b)

(c)

(a)

(b)

(c)

(d)

HANDLE HAVING ENGAGING PORTION

CROSS-REFERENCE TO RELATED APPLICATION

This application is a continuation application of U.S. application Ser. No. 17/553,829 filed on Dec. 17, 2021, the entire contents of which are hereby incorporated by reference for which priority is claimed under 35 U.S.C. § 120.

BACKGROUND OF THE INVENTION

1. Field of the Invention

The present disclosure relates to a handle having an engaging portion, and in particular to a handle having an engaging portion and adapted to be mounted on an object in order to be in use and dismounted from the object when not in use. Therefore, the handle is not only easy to operate and use but is also not susceptible to collisions.

2. Description of the Related Art

Conventional objects (for example, computer cases, boxes and doors) usually come with handles which users exert a force on in order to carry or transport the objects.

The two ends of the aforesaid conventional handle are fastened and fixed to the aforesaid conventional object with screws. After that, the handle immovably sticks out from the outer surface of the object, leading to interference with the object lying near a wall or collisions when not in use. In addition, after long use, the screws are likely to loosen and detach, leading to separation of the handle from the object.

BRIEF SUMMARY OF THE INVENTION

An objective of the present disclosure is to provide a handle having an engaging portion and capable of being mounted on an object to become operable and being dismounted from the object in order to idle, so as to enhance ease of use and prevent collisions.

To achieve at least the above objective, the present disclosure provides a handle having an engaging portion. The handle comprises a body portion and a second engaging portion. The second engaging portion is disposed at the body portion, has a neck portion, and is inserted into, fitted to or snap-engaged with an object.

Optionally, a connecting portion is disposed at the other end of the body portion.

Optionally, the second engaging portion is adapted to enter an insertion portion of the object. Then, the neck portion is inserted into the snap-engaging portion of the object.

Optionally, after the neck portion has been inserted into the snap-engaging portion, an engaging element is inserted into or fastened to a connecting portion at the other end of the body portion so as to be fitted to the object.

Optionally, the second engaging portions are disposed at two ends of the handle, whereas the object has two insertion portions and two snap-engaging portions. The second engaging portions enter the insertion portions of the object. Then, the neck portions are inserted into the snap-engaging portions of the object, respectively, and then engaged with the object.

Optionally, the second engaging portions enter the insertion portions of the object, whereas the neck portions are inserted into the interposed portion of the object. Then, a snap-engaged portion of each second engaging portion is snap-engaged with a corresponding one of the snap-engaging portions of the object.

Optionally, the second engaging portion has an abutting component. The abutting component is inserted into or enters the snap-engaging portion to abut against the body portion and the object or abut against the second engaging portion and the object.

Optionally, the neck portion has a blocking portion. The blocking portion is disposed in the body portion. An abutting component is disposed between the body portion and the blocking portion. The two ends of the abutting component abut against the body portion and the blocking portion, respectively, to place the neck portions normally at a retracted position.

Optionally, the neck portions are pulled out of the retracted position under an external force to enter and engage with the snap-engaging portions.

Optionally, the neck portion has a blocking portion. The blocking portion is disposed in the body portion. An abutting component is disposed between the body portion and the blocking portion. The two ends of the abutting component abut against the body portion and the blocking portion, respectively, to place the neck portions normally at a retracted position.

Optionally, the neck portions are pulled out of the retracted position under an external force to enter the interposed portion, allowing the snap-engaged portion to be engaged with the snap-engaging portion.

Optionally, the blocking portion is disposed at the first engaging portion, and the first engaging portion is fitted to the body portion.

Optionally, the abutting component is a leaf spring, resilient cylinder, spring or resilient clip.

Optionally, the second engaging portion has a neck portion. The neck portion is a material-storing space. An external force is exerted on the body portion or the second engaging portions, such that a material of the object enters or flows into the material-storing space, thereby allowing the handle and the object to be fitted together.

Optionally, the external force is further exerted on a shoulder portion of the body portion.

Optionally, the second engaging portion is subjected to an external force to form a neck portion, and the neck portion is a material snap-engagement portion adapted to be snap-engaged with the object and thereby fitted to the object.

Optionally, the second engaging portions are neck portions. The body portion or the neck portions have a weldable surface adapted to be welded to a corresponding portion of the object.

Optionally, the body portion or the second engaging portions are adapted to be welded to a corresponding portion of the object with a solder. The corresponding portion is a corresponding opening, slot, flat surface, dent or protrusion.

Optionally, after being fetched with a tool, the handle is placed on the object to effectuate connection therebetween.

Optionally, after being fetched with a tool, the handle is placed at a connection position of the object. Alternatively, after having been fetched with a tool, the handle is compared with the object in terms of the connection position thereof by a comparison device, so as for the handle to be precisely placed at the connection position of the object, thereby allowing the handle and the object to be connected.

Optionally, the handle is placed on a carrier, and the carrier has or has not a cover.

Optionally, the body portion has a first engaging portion, and the first engaging portion is fitted to, connected to or integrally formed with the second engaging portions and the neck portions.

Optionally, the first engaging portion is fitted to the body portion, movably fitted to the body portion, or fitted to the body portion through a fitting member.

Optionally, the fitting member is a rod, clip, rivet or pin.

Optionally, the body portion has a material-squeezing portion for squeezing the material of the object into the neck portions.

Optionally, the handle has an anti-slip portion for preventing slips. The anti-slip portion is a protrusion, dent, anti-slip element, flat surface, dentate portion, step portion, arcuate surface, curved surface or inclined surface.

Optionally, the object is a casing, panel, box, circuit board, plate, metallic item or plastic item.

Optionally, the snap-engaging portion is a protrusion, dent or resist structure for interfering with or resisting the body portion, the second engaging portions or the handle.

Optionally, the interposed portion is a protrusion, dent or resist structure for interfering with or resisting the body portion, the second engaging portion, the snap-engaged portion or the handle.

Optionally, the neck portion has an operating portion extended to the outer side of the handle to control the movement of the second engaging portion.

Optionally, the handle has two second engaging portions. One of the second engaging portions enters the insertion portion of the object and then enters the interposed portion of the object before being inserted into the snap-engaging portion of the object. The other second engaging portion enters the insertion portion of the object before being inserted into the snap-engaging portion of the object.

Optionally, the handle has two second engaging portions. The second engaging portions enter the insertion portions of the object and then enter the interposed portions of the object before being inserted into the snap-engaging portions of the object.

Optionally, the handle has a second engaging portion and a connecting portion. The second engaging portion enters the insertion portion of the object and then enters the interposed portion of the object before being inserted into the snap-engaging portion of the object. The connecting portion is fixed to the object.

Optionally, the connecting portion is a screwing portion, second engaging portion, second resilient engaging portion, second catching engaging portion, nut portion or screw portion.

Optionally, the handle has at least two engaging portions whereby the second engaging portions are inserted into at least one snap-engaging portion of the object. The two engaging portions are inserted into at least one snap engagement portion of the object to limit the lateral movement, vertical movement or rotational movement of the second engaging portions. Alternatively, the two engaging portions abut against or interfere with the surface of the object to limit the lateral movement, vertical movement or rotational movement of the second engaging portions.

Optionally, the handle has at least two engaging portions whereby the second engaging portions are inserted into at least one snap-engaging portion of the object. Then, the two engaging portions are inserted into at least one snap engagement portion of the object to limit the lateral movement, vertical movement or rotational movement of the second engaging portions. Alternatively, the two engaging portions abut against or interfere with the surface of the object to limit the lateral movement, vertical movement or rotational movement of the second engaging portions.

Optionally, the two engaging portions are each a resilient clip with a resilient engaging arm.

Optionally, the snap engagement portion is in communication with the snap-engaging portion. Alternatively, the snap engagement portion is not in communication with the snap-engaging portion.

Optionally, the body portion, second engaging portions or neck portions are formed by plastic in-mold injection molding.

Optionally, the body portion, second engaging portions, neck portions or two engaging portions are formed by plastic in-mold injection molding.

Optionally, the handle and the object are fitted together or movably fitted together by lathing, forging, injection, in-mold injection, stamping, or bending.

Optionally, the handle is made of a metallic material, non-metallic material or plastic material.

Optionally, the second engaging portions has a smaller width than the insertion portions, whereas the snap-engaging portion has a larger width than the neck portions and is smaller than the second engaging portions.

Optionally, the second engaging portions has a smaller width than the insertion portions, whereas the snap-engaging portion or the interposed portion has a larger width than the neck portions or the snap-engaged portion and is smaller than the second engaging portions.

Optionally, the body portion or second engaging portions have an interfering portion for interfering with or resisting the object.

Optionally, the abutting component is integrally formed with the handle.

Optionally, the abutting component and the handle are connected by a connecting portion.

Optionally, the connecting portion is integrally formed with the handle. Alternatively, the connecting portion and the handle are fitted together with bolts or by riveting, engagement, expanded connection, welding, fastening, snap-engagement, hot melting or in-mold injection.

Optionally, the surface of the connecting portion has a rotation-preventing portion for preventing the detachment or rotation of the connecting portion fitted to the body portion.

Optionally, the rotation-preventing portion is an embossed pattern, dentate pattern, polygon, protrusion, dent, flat surface portion, arcuate surface portion, curved surface portion, section portion, slot portion or hole portion.

Optionally, the neck portion is provided in the form of two notches, one notch or a cylinder smaller than the body portion or second engaging portion.

Optionally, the anti-slip portion is a dent or protrusion whereby during a plastic injection molding process performed to produce the handle the surface thereof is prevented from contracting or sagging.

Optionally, the body portion or the second engaging portions has an electroplating layer, and the electroplating layer is a zinc-plated layer, nickel-plated layer, tin-plated layer, chromium-plated layer, anode layer or copper-plated layer.

Optionally, the body portion or the second engaging portions have a baking varnish layer.

Optionally, the body portion or the second engaging portion has a plastic color sheath or plastic layer.

Optionally, the body portion or the second engaging portions are made of a metallic material, non-metallic material or plastic material. Alternatively, the surface of the head portion or the surface of the body portion has a dustproof layer.

Optionally, the body portion or the second engaging portions are immersed in a conduction solution, and the dustproof layer material is attached to the head portion or the body portion through the conduction solution.

Optionally, the body portion, the second engaging portion, the conduction solution or the dustproof layer material is capable of conducting an electrical current, thereby allowing the dustproof layer material to move and attached to the head portion or the body portion.

Optionally, the body portion is formed by plastic or metal injection molding in a die. The die has a sprue. Molten plastic or metal enters the die through the sprue and then forms the body portion by solidification and molding.

Optionally, the first engaging portion and the object are fitted together by riveting, expanded connection, welding or fastening.

Optionally, a floating level exists between the body portion and the first engaging portion, between the body portion and the fitting member, or between the first engaging portion and the fitting member.

Optionally, the first engaging portion and the body portion are fitted to the body portion through a fitting member, whereas a floating level exists between the body portion and the fitting member or between the first engaging portion and the fitting member.

Optionally, the floating level ranges from 0.0001 mm to 100 mm.

Optionally, the body portion and the second engaging portion are fitted together by a fitting member therebetween.

Optionally, the fitting member has a head portion, an expanded connection portion and a resist portion. The fitting member is penetratingly disposed at the body portion and the second engaging portions. The resist portion is disposed at the expanded connection portion. The head portion abuts against the body portion. The expanded connection portion abuts against the resist portion. The expanded connection portion and the resist portion are disposed at the second engaging portions.

Optionally, the handle further comprises a resilient component with one end abutting against the second engaging portion and the other end abutting against the resist portion.

Optionally, the fitting member has a head portion and an expanded connection portion. The fitting member is penetratingly disposed at the body portion and the second engaging portions. The expanded connection portion abuts against the body portion. The head portion is disposed at the second engaging portion.

Optionally, the handle further comprises a resilient component with one end abutting against the second engaging portion and the other end abutting against the head portion.

Optionally, the body portion has a penetrable portion, and the fitting member is penetratingly disposed at the penetrable portion, so as to fit the body portion and the second engaging portion together.

Optionally, the second engaging portion has a rotation-preventing portion, and the object has a corresponding rotation-preventing portion, so as to correspondingly prevent rotation of the second engaging portion, fix the orientation of the second engaging portion, or fix the mounting position of the second engaging portion and the mounting position of the object.

Optionally, a solder layer is disposed between the object and the body portion, the first engaging portion or the second engaging portion and adapted to be heated and then cooled to solidify. The object is a printed circuit board (PCB).

Optionally, after being squeezed, the material of the object flows into or enters, or is squeezed into the second engaging portion.

Optionally, the handle further comprises a corresponding connection portion. The corresponding connection portion engages with the connecting portion and abuts against the object to prevent rotation. Then, the handle and the body portion clamp the object. Alternatively, after the corresponding connection portion has been applied to a welding process, the handle and the body portion clamp the object. Alternatively, after the corresponding connection portion has been applied to a welding process and rotation prevention, the handle and the body portion clamp the object.

Optionally, the first engaging portion or the second engaging portion is movably mounted on the body portion. Alternatively, the first engaging portion or the second engaging portion is fixedly mounted on the body portion. Alternatively, the first engaging portion or the second engaging portion is integrally formed with the body portion.

Optionally, a floating level exists between the body portion and the first engaging portion to allow the material snap-engaging portion of two first engaging portions to be inserted into two hole portions of the object within the floating ranges of the floating level so as to connect to the object.

Optionally, a floating level exists between the body portion and the first engaging portion to allow the material snap-engaging portion of the first engaging portion to be inserted into a hole portion of the object within the floating ranges of the floating level so as to connect to the object.

Optionally, the penetrable portion of the body portion is formed by plastic or metal injection molding in a die. The die has a sprue and a limiting portion. Molten plastic or metal enters the die through the sprue and then stays away from the limiting portion to form the penetrable portion of the body portion by solidification and molding.

Optionally, a floating level exists between the first engaging portion and the second engaging portion.

Optionally, the first engaging portion is fitted to the second engaging portion through a fitting member. A floating level exists between the first engaging portion and the fitting member. Alternatively, a floating level exists between the second engaging portion and the fitting member.

Optionally, the second engaging portion forms the neck portion under an external force. The neck portion is a material snap-engaging portion adapted to be snap-engaged with a blocking element to stop the object and thereby fit to the object.

Optionally, the second engaging portion is fitted to the object, and a floating level exists between the second engaging portion and the object.

DETAILED DESCRIPTION OF THE INVENTION

Figure 1:
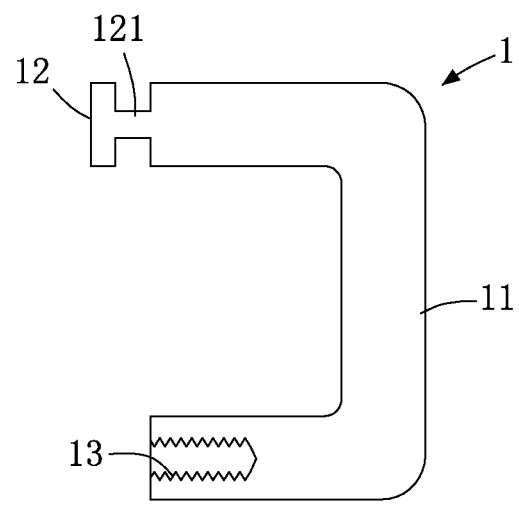
FIG. 1 is a cross-sectional view of the $1^{st}$ embodiment of the present disclosure.
Figure 2:
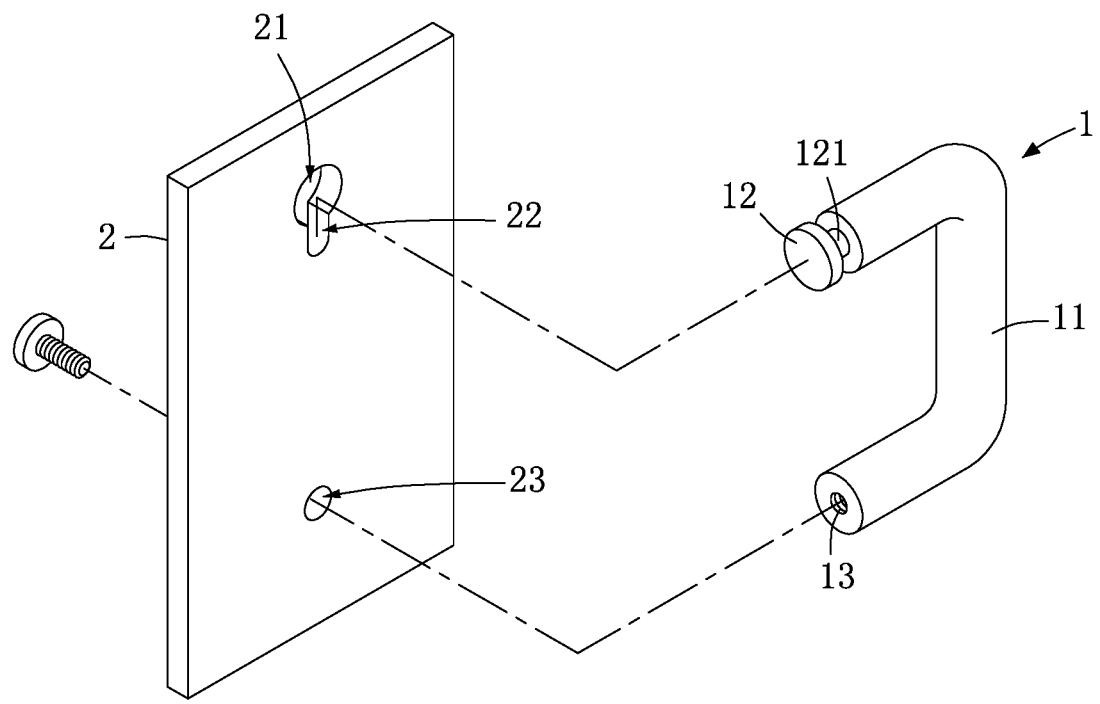
FIG. 2 is a schematic view 1 of an assembly state of the $1^{st}$ embodiment of the present disclosure.
Figure 3:
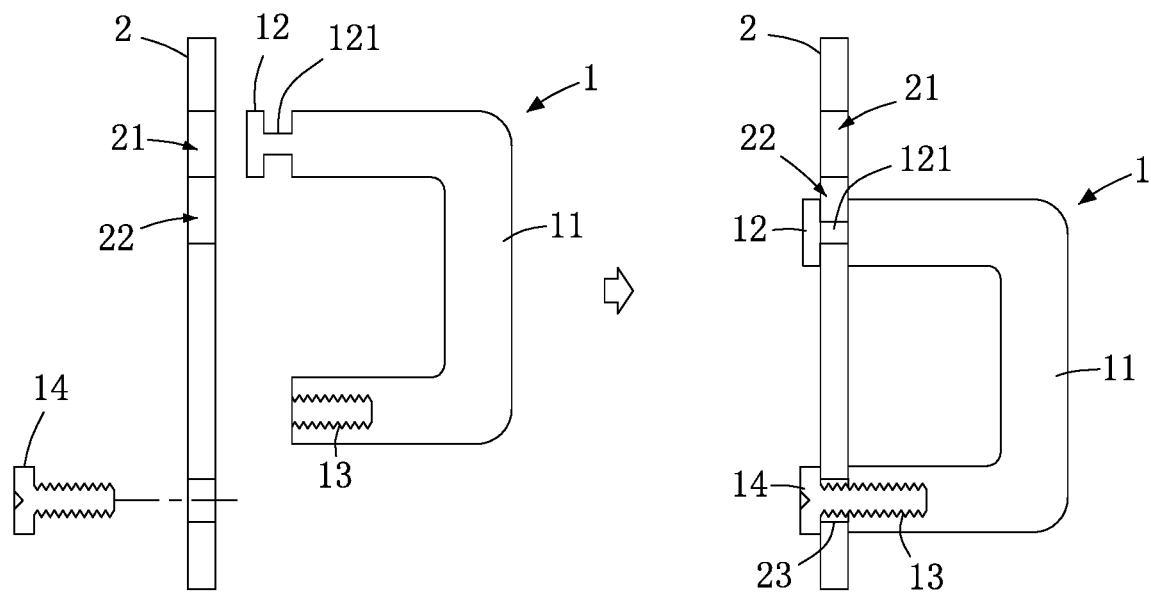
FIG. 3 is a schematic view 2 of an assembly state of the $1^{st}$ embodiment of the present disclosure.
Figure 4:
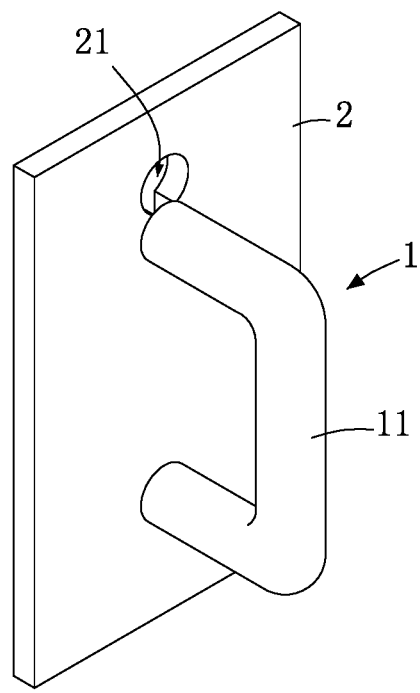
FIG. 4 is a schematic view 3 of an assembly state of the $1^{st}$ embodiment of the present disclosure.

To facilitate understanding of the object, characteristics and effects of this present disclosure, embodiments together with the attached drawings for the detailed description of the present disclosure are provided.

Referring to FIG. 1 through FIG. 4, the present disclosure provides a handle 1 having an engaging portion. The handle 1 comprises a body portion 11 and a second engaging portion 12.

The second engaging portion 12 is disposed at one end of the body portion 11. The second engaging portion 12 has a neck portion 121 adapted to be inserted into, fitted to or snap-engaged with an object 2.

To start using the handle 1, the second engaging portion 12 of the handle 1 is mounted on the object 2. When the use of the handle 1 is no longer required, the second engaging portion 12 of the handle 1 is dismounted from the object 2. Therefore, the handle 1 is not only easy to operate and use but is also not susceptible to collisions.

In a preferred embodiment of the present disclosure, a connecting portion 13 is disposed at the other end of the body portion 11. The object 2 has an insertion portion 21 and a snap-engaging portion 22 which are in communication with each other. After the second engaging portion 12 of the handle 1 has entered the insertion portion 21 of the object 2, the neck portion 121 is inserted into the snap-engaging portion 22 of the object 2. After the neck portion 121 has been inserted into the snap-engaging portion 22, the connecting portion 13 corresponds in position to a corresponding portion 23 of the object 2; meanwhile, an engaging element 14 is inserted into or fastened to the connecting portion 13 at the other end of the body portion 11 to fit the handle 1 and the object 2 together. When the handle 1 is dismounted, the engaging element 14 can be removed from the connecting portion 13. Then, the neck portion 121 moves from the snap-engaging portion 22 to the insertion portion 21, and thus the object 2 is detached because of the second engaging portions 12, thereby separating the handle 1 and the object 2. Thus, the handle 1 is mounted on the object 2 in order to be in use and dismounted from the object 2 when not in use. Therefore, the handle 1 is not only easy to operate and use but is also not susceptible to collisions.

In a preferred embodiment of the present disclosure, the object 2 is a casing, panel, box, circuit board, plate, metallic item or plastic item. Therefore, the present disclosure meets practical needs.

In a preferred embodiment of the present disclosure, the snap-engaging portion 22 is a protrusion, dent or resist structure for interfering with or resisting the body portion 11, the second engaging portions 12 or the handle 1. Therefore, the present disclosure meets practical needs.

In a preferred embodiment of the present disclosure, the connecting portion 13 is a screwing portion, second engaging portion, second resilient engaging portion, second catching engaging portion, nut portion or screw portion. Therefore, the present disclosure meets practical needs.

In a preferred embodiment of the present disclosure, the connecting portion 13 is integrally formed with the handle 1. Alternatively, the connecting portion 13 and the handle 1 are fitted together with a bolt. Alternatively, the connecting portion 13 and the handle 1 are fitted together by riveting, engagement, expanded connection, welding, fastening, snap-engagement or hot melting. Alternatively, the connecting portion 13 and the handle 1 are fitted together by in-mold injection.

In a preferred embodiment of the present disclosure, the handle 1 and its constituent elements are fitted together by lathing, forging, injection, in-mold injection, stamping, bending, or mutually movably fitting. Therefore, the present disclosure meets practical needs.

In a preferred embodiment of the present disclosure, the handle 1 and its constituent elements are made of a metallic material, non-metallic material or plastic material. Therefore, the present disclosure meets practical needs.

In a preferred embodiment of the present disclosure, the body portion 11, second engaging portions 12 or neck portions 121 are made by plastic in-mold injection molding. Therefore, the present disclosure meets practical needs.

In a preferred embodiment of the present disclosure, the second engaging portions 12 have a smaller width than the insertion portions 21, whereas the snap-engaging portion 22 has a larger width than the neck portion 121 and is smaller than the second engaging portion 12. Therefore, after the second engaging portion 12 has entered the insertion portion 21 of the object 2, the neck portion 121 is inserted into the snap-engaging portion 22 of the object 2, thereby allowing the handle 1 and the object 2 to be firmly coupled together.

Figure 5:
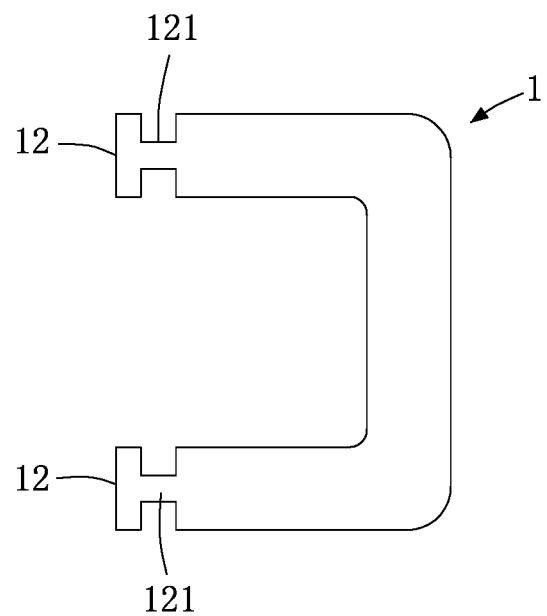
FIG. 5 is a cross-sectional view of the $2^{nd}$ embodiment of the present disclosure.
Figure 6:
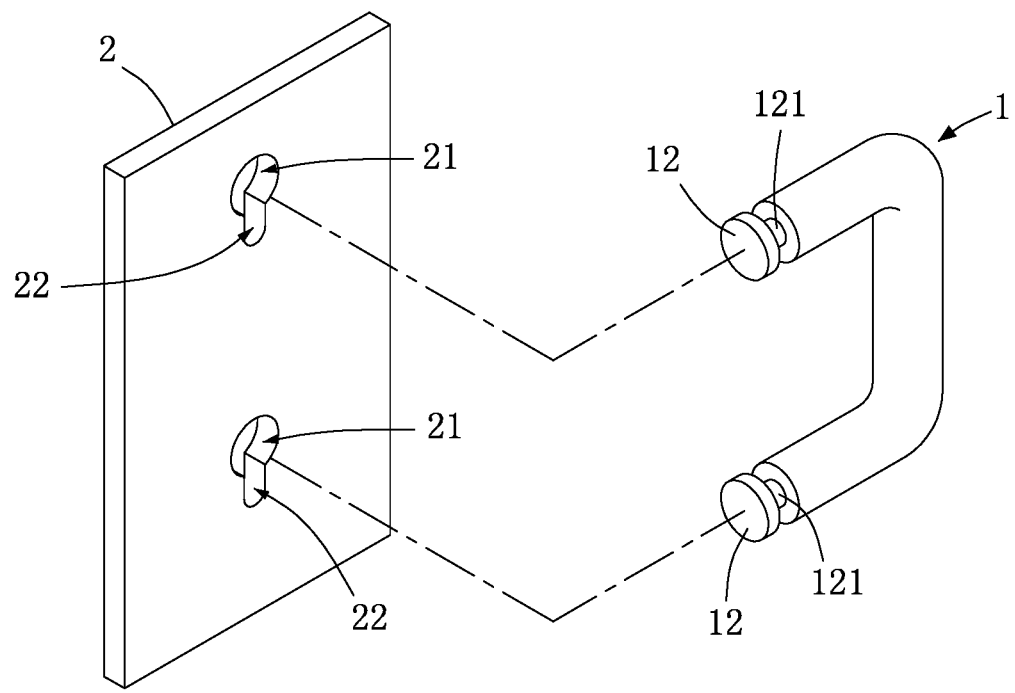
FIG. 6 is a schematic view of an assembly state of the $2^{nd}$ embodiment of the present disclosure.

Referring to FIG. 5 and FIG. 6, in a preferred embodiment of the present disclosure, the two ends of the handle 1 each have a second engaging portion 12, whereas the object 2 has two insertion portions 21 and two snap-engaging portions 22. After the second engaging portions 12 have entered the insertion portions 21 of the object 2, respectively, the neck portions 121 are inserted into the snap-engaging portions 22 of the object 2, respectively, such that the handle 1 is engaged with the object 2. To stop using the handle 1, the neck portions 121 are moved from the snap-engaging portions 22 to the insertion portions 21, respectively, and thus the object 2 is detached because of the second engaging portions 12, thereby separating the handle 1 and the object 2. Thus, the handle 1 is mounted on the object 2 in order to be in use and dismounted from the object 2 when not in use. Therefore, the handle 1 is not only easy to operate and use but is also not susceptible to collisions.

Figure 7:
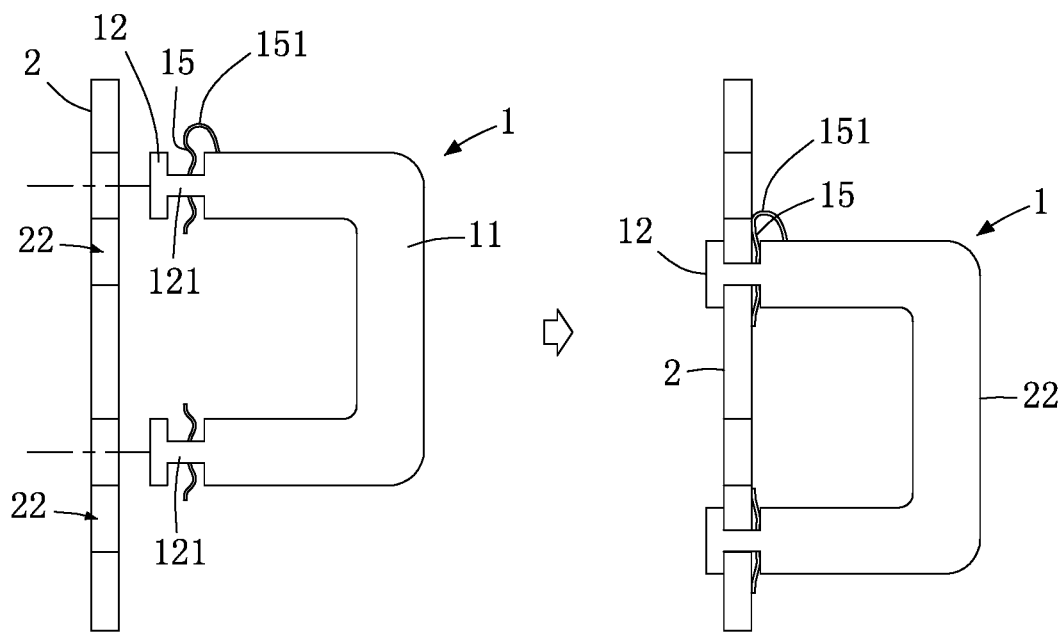
FIG. 7 is a schematic view 1 of an assembly state of the $3^{rd}$ embodiment of the present disclosure.
Figure 8:
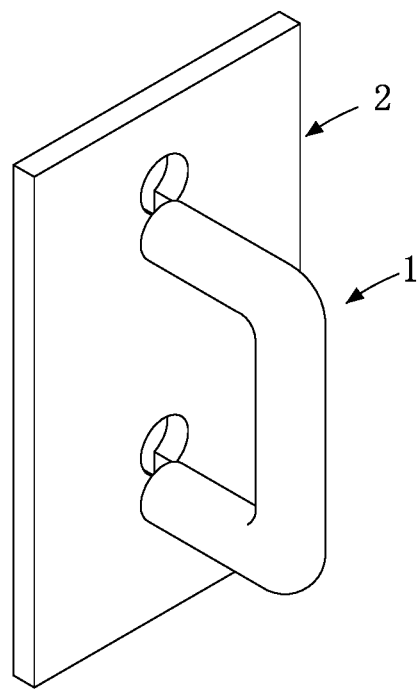
FIG. 8 is a schematic view 2 of an assembly state of the $3^{rd}$ embodiment of the present disclosure.

Referring to FIG. 7 and FIG. 8, in a preferred embodiment of the present disclosure, each second engaging portion 12 has an abutting component 15. The abutting components 15 are fitted to the neck portions 121. The abutting components 15 are inserted into the snap-engaging portions 22 of the object 2, allowing the body portion 11 to abut against the object 2. In this embodiment, the second engaging portions 12 are in the number of two, and the abutting components are in the number of two. In a variant embodiment, the second engaging portion 12 is in the number of one, and the abutting component 15 is in the number of one. Thus, the abutting components 15 enable the handle 1 and the object 2 to be firmly coupled together.

In a preferred embodiment of the present disclosure, the abutting components 15 are each a leaf spring, resilient cylinder, spring or resilient clip, and the abutting components 15 are integrally formed with the handle 1 (not shown). Therefore, the present disclosure meets practical needs.

In a preferred embodiment of the present disclosure, the abutting component 15 and the handle 1 are connected by a connecting portion 151. Therefore, the present disclosure meets practical needs.

Figure 9:
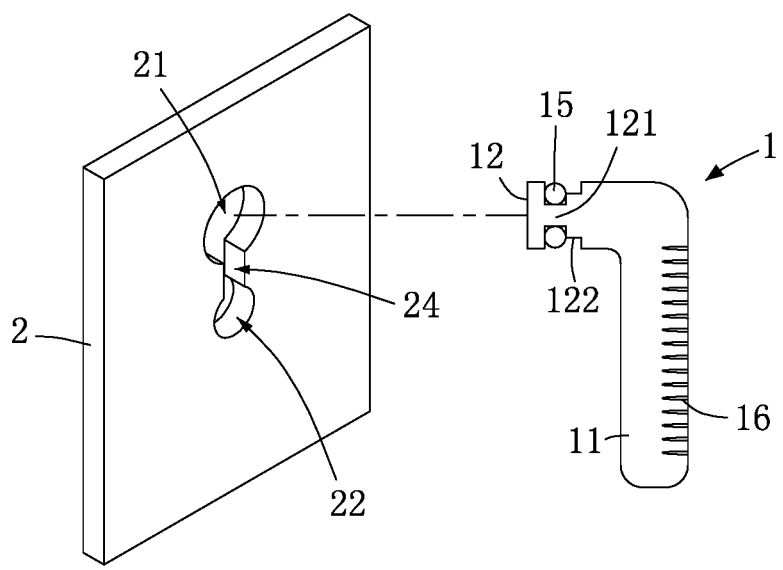
FIG. 9 is a schematic view of the framework of the $4^{th}$ embodiment of the present disclosure.
Figure 10:
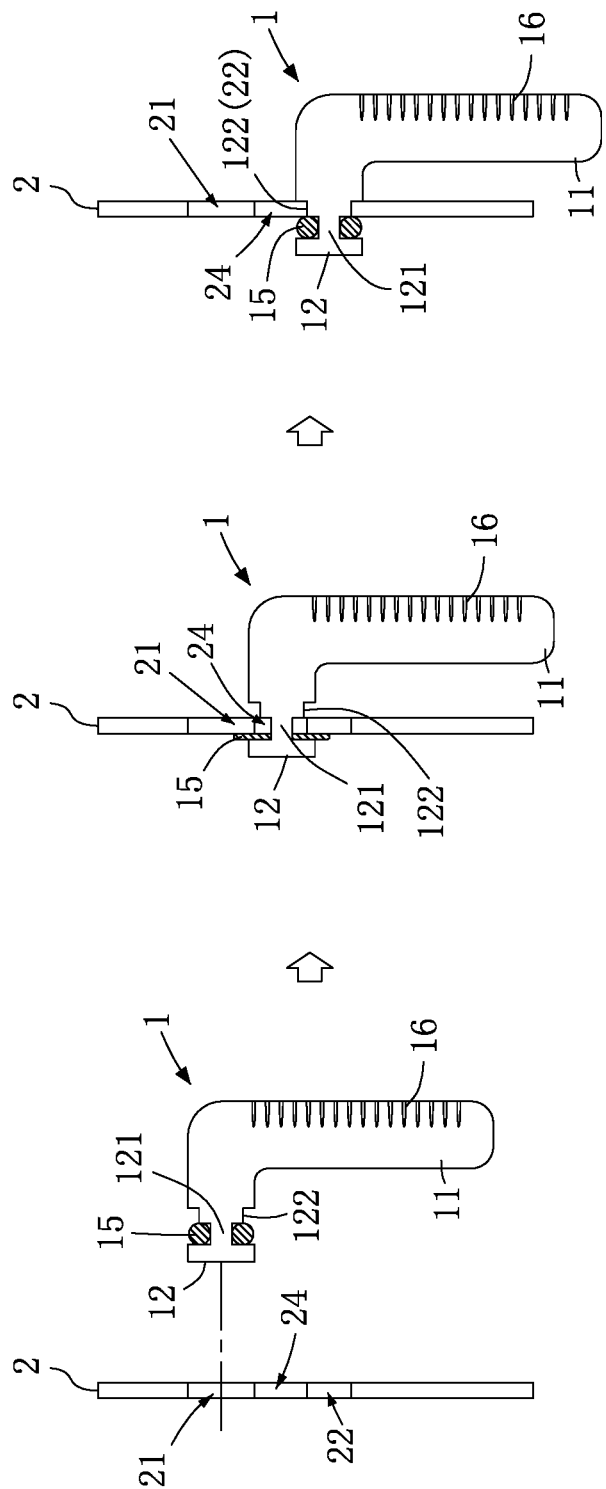
FIG. 10 is a schematic view of an assembly state of the $4^{th}$ embodiment of the present disclosure.

Referring to FIG. 9 and FIG. 10, in a preferred embodiment of the present disclosure, the second engaging portion 12 has an abutting component 15 and a snap-engaged portion 122. The object 2 has the insertion portion 21, the snap-engaging portion 22 and an interposed portion 24 which are in communication with each other. The interposed portion 24 is disposed between the insertion portion 21 and the snap-engaging portion 22. The second engaging portion 12 enters the insertion portion 21 to cause the neck portion 121 to be inserted into the interposed portion 24, cause the snap-engaged portion 122 to be snap-engaged with the snap-engaging portion 22, and cause the abutting component 15 to be inserted into or to enter the snap-engaging portion 22, thereby allowing the second engaging portion 12 to abut against the object 2. Therefore, the handle 1 and the object 2 are firmly coupled together.

In a preferred embodiment of the present disclosure, the handle 1 has an anti-slip portion 16 for preventing slips. The anti-slip portion 16 is a protrusion, dent, anti-slip element, flat surface, dentate portion, step portion, arcuate surface, curved surface or inclined surface. Therefore, the present disclosure meets practical needs.

In a preferred embodiment of the present disclosure, the interposed portion 24 is a protrusion, dent or resist structure for interfering with or resisting the body portion 11, the second engaging portions 12, the snap-engaged portion 122 or the handle 1. Therefore, the present disclosure meets practical needs.

In a preferred embodiment of the present disclosure, the second engaging portion 12 has a smaller width than the insertion portion 21, whereas the snap-engaging portion 22 or the interposed portion 24 has a larger width than the neck portion 121 or the snap-engaged portion 122 and is smaller than the second engaging portion 12. Therefore, the second engaging portion 12 can enter the insertion portion 21, and the neck portion 121 is inserted into the interposed portion 24. Next, the snap-engaged portion 122 of the second engaging portion 12 is snap-engaged with the snap-engaging portion 22. Therefore, the handle 1 and the object 2 are firmly coupled together.

Figure 11:
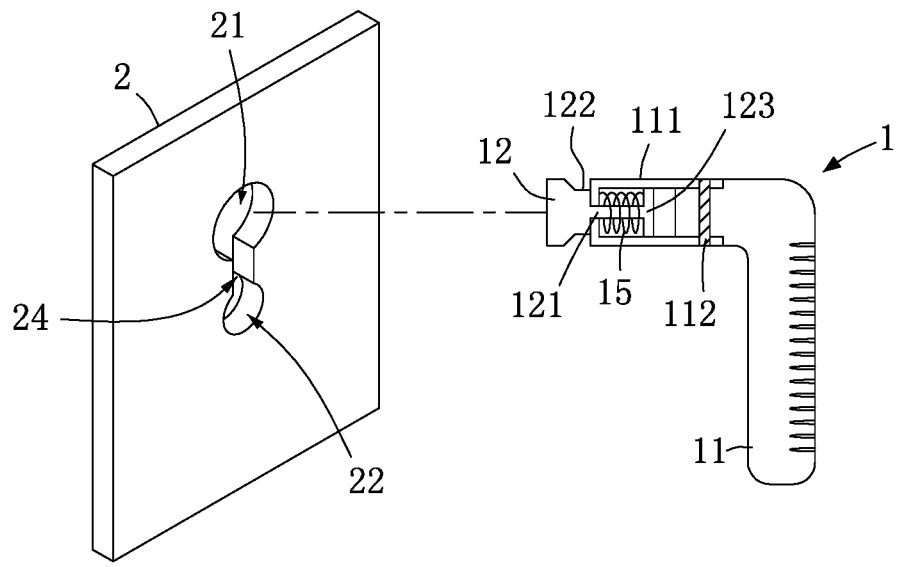
FIG. 11 is a schematic view of the framework of the $5^{th}$ embodiment of the present disclosure.
Figure 12:
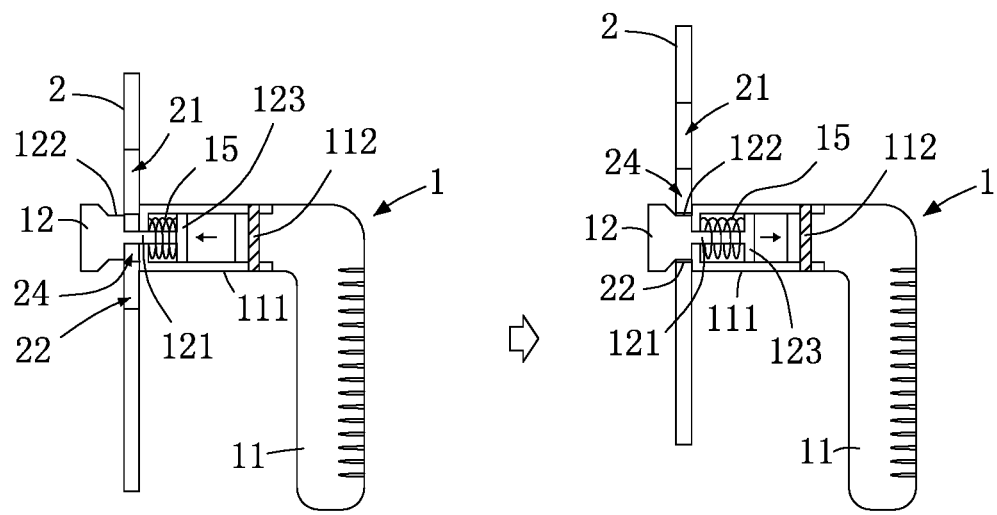
FIG. 12 is a schematic view of an assembly state of the $5^{th}$ embodiment of the present disclosure.

Referring to FIG. 11 and FIG. 12, in a preferred embodiment of the present disclosure, the neck portion has a blocking portion 123. The blocking portion 123 is disposed in the body portion 11. An abutting component 15 is disposed between the body portion 11 and the blocking portion 123. The two ends of the abutting component 15 abut against the body portion 11 and the blocking portion 123, respectively, to place the neck portions 12 normally at a retracted position. To start using the handle 1, the neck portions 121 are pulled out of the retracted position under an external force to enter the interposed portion 24, allowing the snap-engaged portion 122 to be engaged with the snap-engaging portion 22. Therefore, the handle 1 and the object 2 are firmly coupled together.

In a preferred embodiment of the present disclosure, the body portion 11 has a first engaging portion 111. The first engaging portion 111 is fitted to, connected to, or integrally formed with the second engaging portions 12 and the neck portions 121. The blocking portion 123 is disposed in the first engaging portion 111. The first engaging portion 111 is fitted to the body portion 11. Alternatively, the first engaging portion 111 is movably fitted to the body portion 11. Alternatively, the first engaging portion 111 is fitted to the body portion 11 through a fitting member 112. In this embodiment, the first engaging portion 111 and the body portion 11 are fitted together through the fitting member 112, such that the first engaging portion 111 and the body portion 11 are firmly coupled together.

In a preferred embodiment of the present disclosure, the fitting member 112 is a rod, clip, rivet or pin. Therefore, the present disclosure meets practical needs.

In a preferred embodiment of the present disclosure, the first engaging portion 111 (or the second engaging portions 12) and the body portion 11 are movably fitted together, or the first engaging portion 111 and the body portion 11 are fixedly fitted together. Alternatively, the first engaging portion 111 and the body portion 11 are integrally formed. Therefore, the present disclosure meets practical needs.

Figure 13:
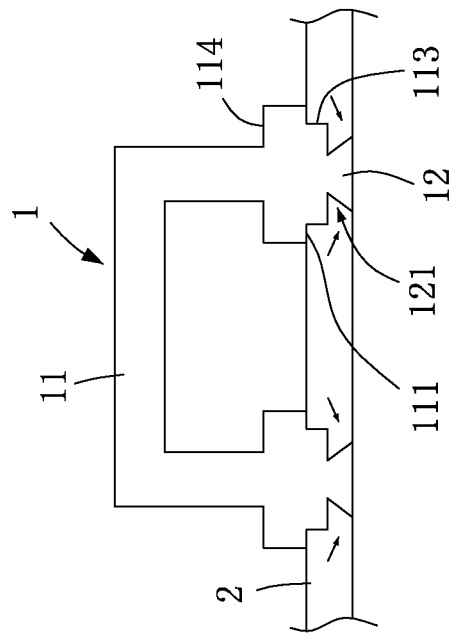
FIG. 13 is a schematic view of an assembly state of the $6^{th}$ embodiment of the present disclosure.
Figure 13:
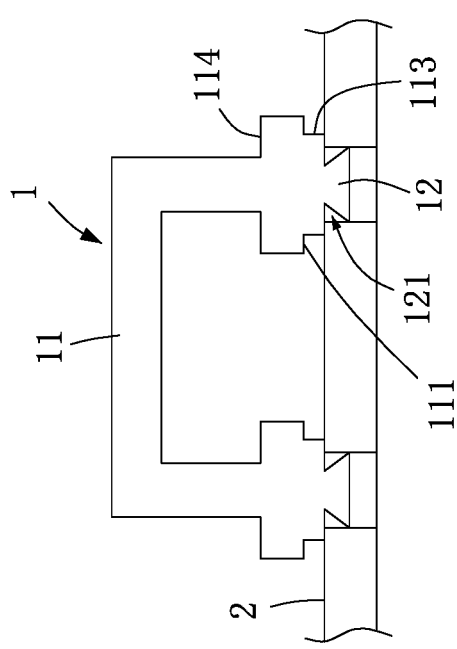

Referring to FIG. 13, in a preferred embodiment of the present disclosure, the first engaging portion 111 is integrally formed with the second engaging portion 12. The second engaging portion 12 has a neck portion 121. The neck portion 12 is a material-storing space. The body portion 11 has a material-squeezing portion 113. An external force is exerted on the body portion 11 or the second engaging portion 12, such that the material of the object 2 enters or flows into the material-storing space and the material-squeezing portion 113, allowing the handle 1 and the object 2 to be fitted together.

In a preferred embodiment of the present disclosure, the external force is further exerted on a shoulder portion 114 of the body portion 11. Therefore, the handle 1 demonstrates ease of use.

Figure 14:
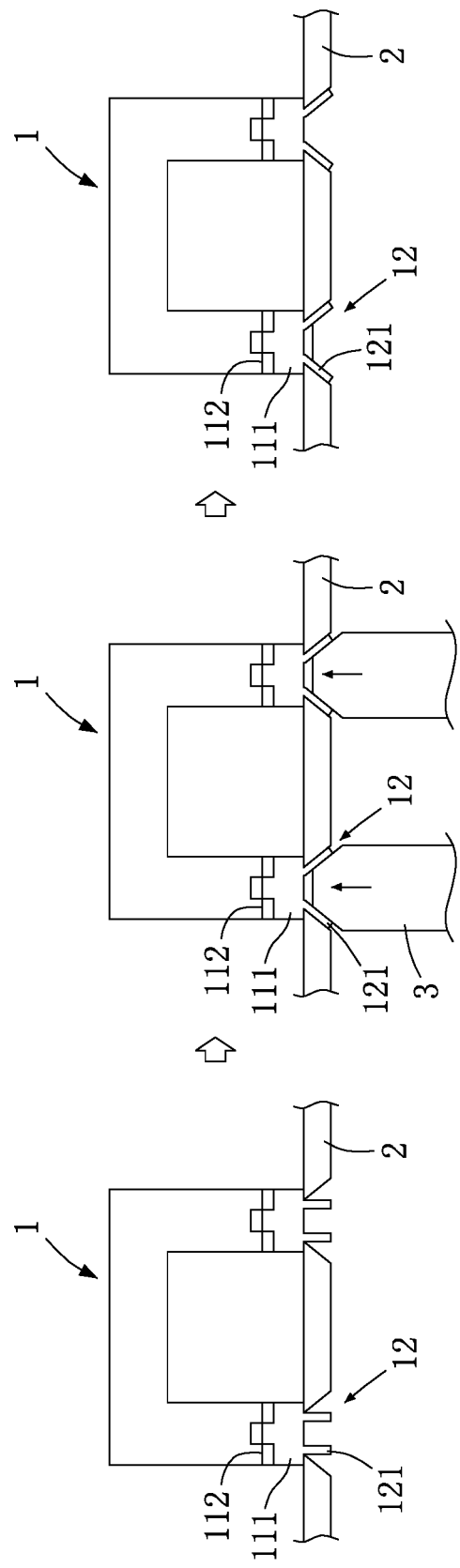
FIG. 14 is a schematic view of an assembly state of the $7^{th}$ embodiment of the present disclosure.

Referring to FIG. 14, in a preferred embodiment of the present disclosure, the second engaging portion 12 forms the neck portion 121 under an external force exerted by a tool 3. The neck portion 121 is a material snap-engagement portion adapted to be snap-engaged with the object 2, thereby allowing the handle 1 and the object 2 to be fitted together.

Figure 15:
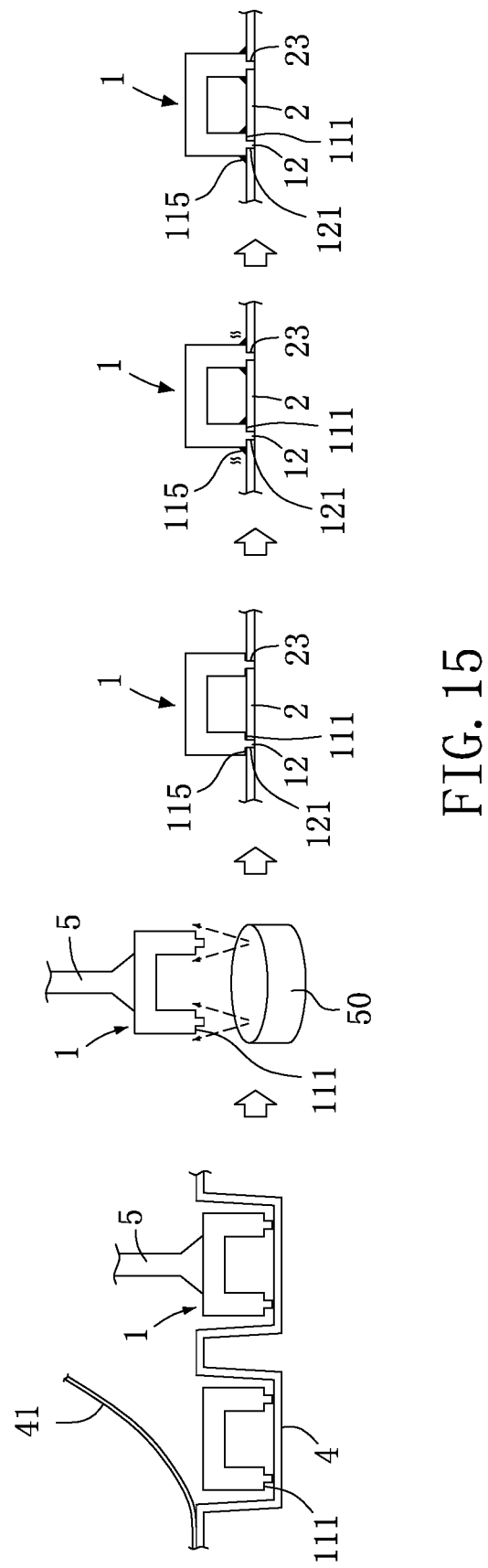
FIG. 15 is a schematic view of an assembly state of the $8^{th}$ embodiment of the present disclosure.

Referring to FIG. 15, in a preferred embodiment of the present disclosure, the handle 1 is placed on a carrier 4. The carrier 4 has or has not a cover 41. After having been fetched with a tool 5, the handle 1 is compared with the object 2 in terms of the connection position thereof by a comparison device 50, so as for the handle 1 to be precisely placed at the connection position of the object 2, thereby allowing the handle 1 and the object 2 to be connected.

In a preferred embodiment of the present disclosure, the second engaging portion 12 is a neck portion, whereas the body portion 11 or the neck portion 12 has a weldable surface 115 adapted to be welded to the corresponding portion 23 of the object 2, thereby allowing the handle 1 and the object 2 to be firmly connected.

In a preferred embodiment of the present disclosure, the body portion 11 or the second engaging portion 12 is adapted to be welded to the corresponding portion 23 of the object 2 by a solder (i.e., the weldable surface 115). The corresponding portion 23 is a corresponding opening, slot, flat surface, dent or protrusion. Therefore, the present disclosure meets practical needs.

Figure 16:
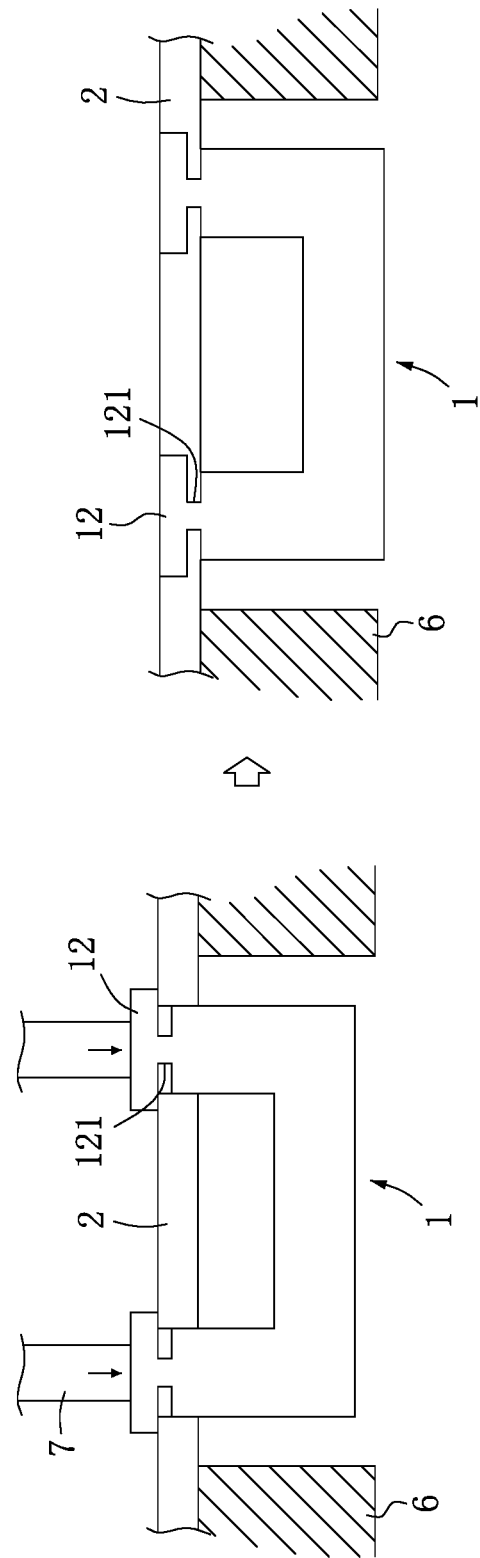
FIG. 16 is a schematic view of an assembly state of the $9^{th}$ embodiment of the present disclosure.

Referring to FIG. 16, in a preferred embodiment of the present disclosure, the second engaging portion 12 has a neck portion 121, and the neck portion 12 is a material-storing space. The object 2 is disposed in a support mold 6. Then, a lower press mold 7 presses against the second engaging portion 12 (or the body portion 11), such that a material of the object 2 enters or flows into the material-storing space (i.e., neck portion 121), allowing the handle 1 and the object 2 to be fitted together.

Figure 19:
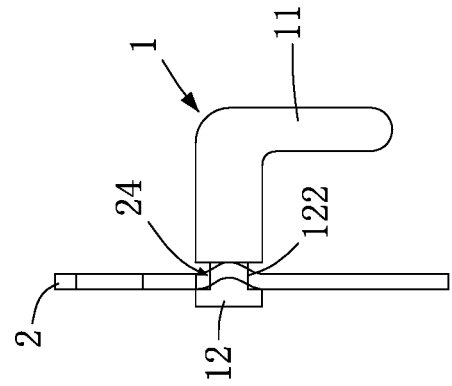
FIG. 19 is a schematic view of an assembly state of the $12^{th}$ embodiment of the present disclosure.
Figure 18:
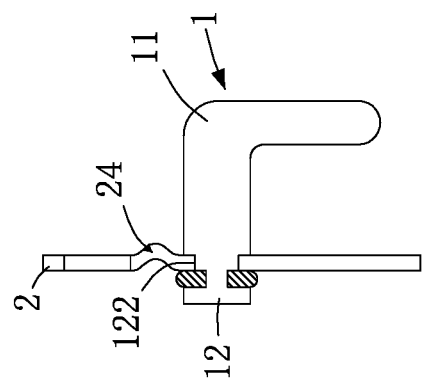
FIG. 18 is a schematic view of an assembly state of the $11^{th}$ embodiment of the present disclosure.
Figure 17:
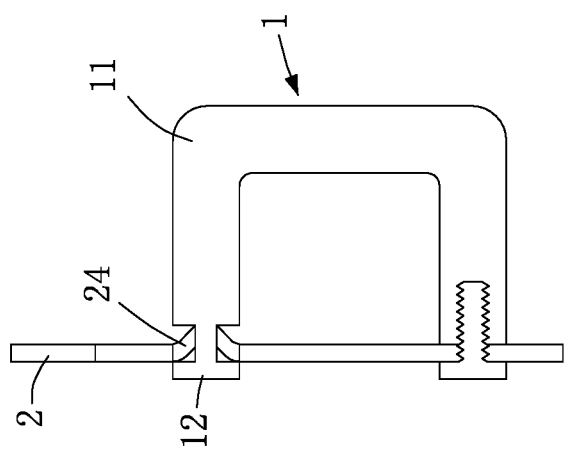
FIG. 17 is a schematic view of an assembly state of the $10^{th}$ embodiment of the present disclosure.

Referring to FIG. 17 through FIG. 19, in a preferred embodiment of the present disclosure, the interposed portion 24 of the object 2 is a resist structure for interfering with or resisting the body portion 11, the second engaging portion 12, the snap-engaged portion 122 or the handle 1. Therefore, the present disclosure meets practical needs.

Figure 20:
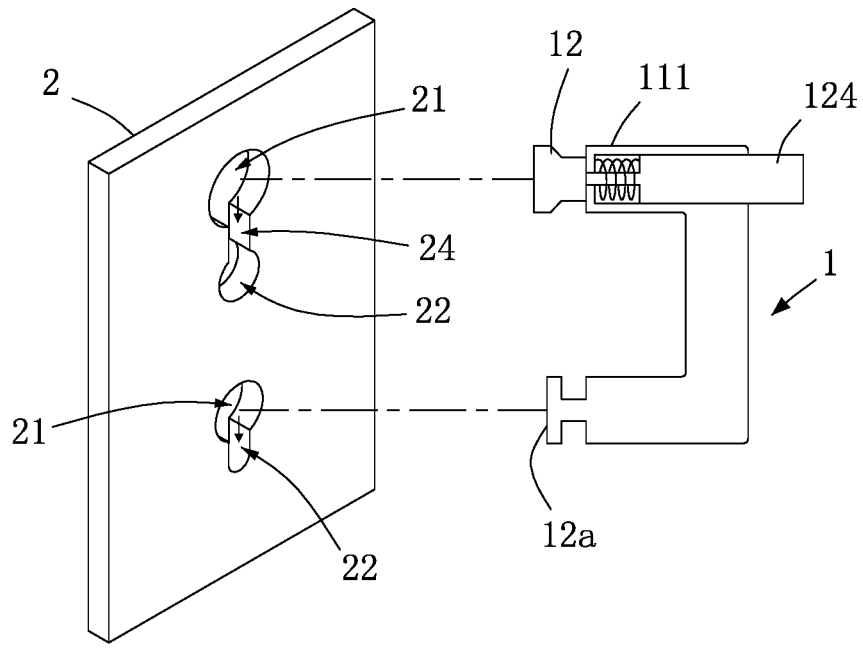
FIG. 20 is a schematic view of an assembly state of the $13^{th}$ embodiment of the present disclosure.

Referring to FIG. 20, in a preferred embodiment of the present disclosure, the handle 1 has two second engaging portions 12, 12a. The neck portion 121 of the second engaging portion 12 has an operating portion 124 extended to the outer side of the handle 1 to control the movement of the second engaging portion 12. During the mounting process, the second engaging portion 12 enters the insertion portion 21 of the object 2 and then enters the interposed portion 24 of the object 2 before being inserted into the snap-engaging portion 22 of the object 2. The second engaging portion 12a enters the insertion portion 21 of the object 2 before being inserted into the snap-engaging portion 22 of the object 2, thereby allowing the handle 1 and the object 2 to be firmly connected.

Figure 21:
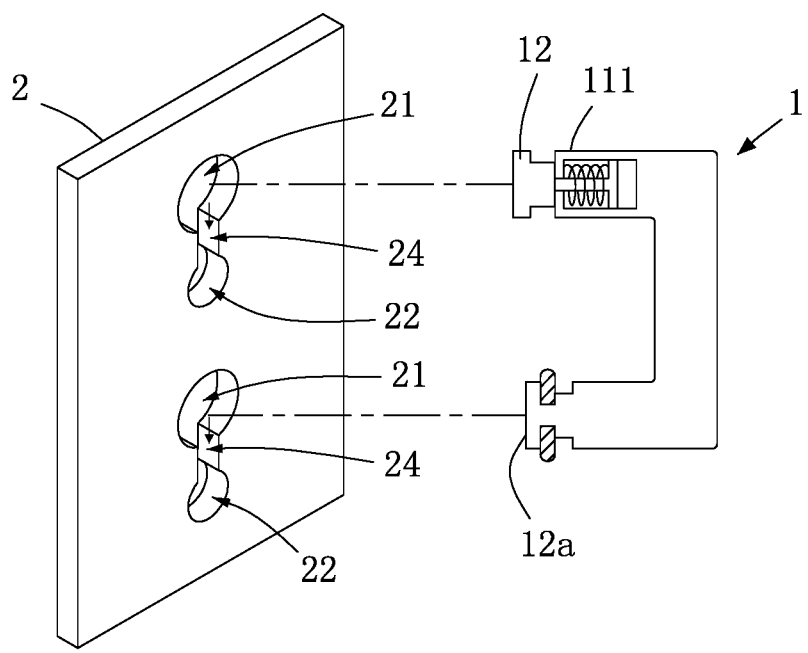
FIG. 21 is a schematic view of an assembly state of the $13^{th}$ embodiment of the present disclosure.

Referring to FIG. 21, in a preferred embodiment of the present disclosure, the handle 1 has two second engaging portions 12, 12a. The second engaging portions 12, 12a enter the insertion portions 21 of the object 2 and then enter the interposed portions 24 of the object 2 before being inserted into the snap-engaging portions 22 of the object 2, thereby allowing the handle 1 and the object 2 to be firmly connected.

Figure 22:
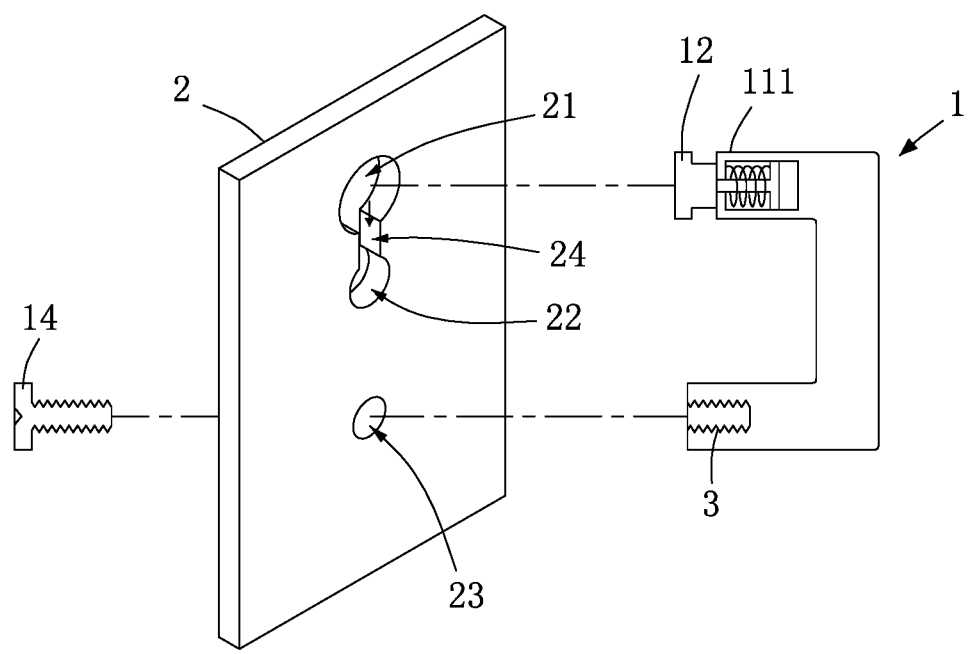
FIG. 22 is a schematic view of an assembly state of the $13^{th}$ embodiment of the present disclosure.

Referring to FIG. 22, in a preferred embodiment of the present disclosure, the handle 1 has a second engaging portion 12 and a connecting portion 13. The second engaging portion 12 enters the insertion portion 21 of the object 2 and then enters the interposed portion 24 of the object 2 before being inserted into the snap-engaging portion 22 of the object 2. The connecting portion 13 is aligned with the corresponding portion 23 of the object 2 and then fitted to the object 2 through the engaging element 14, thereby allowing the handle 1 and the object 2 to be firmly connected.

Figure 23:
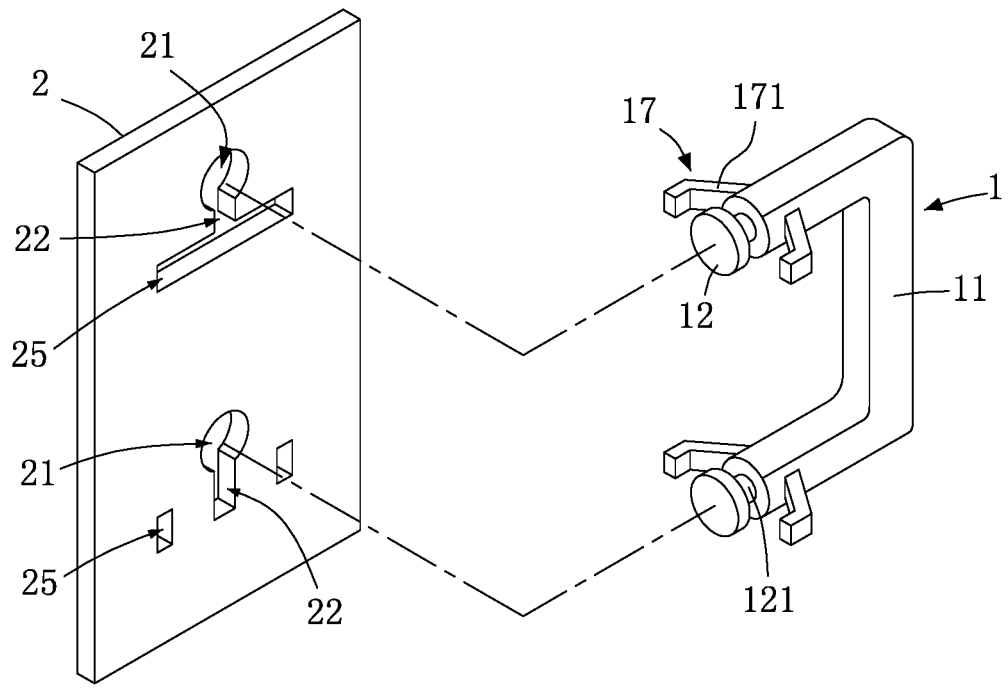
FIG. 23 is a schematic view of an assembly state of the $14^{th}$ embodiment of the present disclosure.
Figure 24:
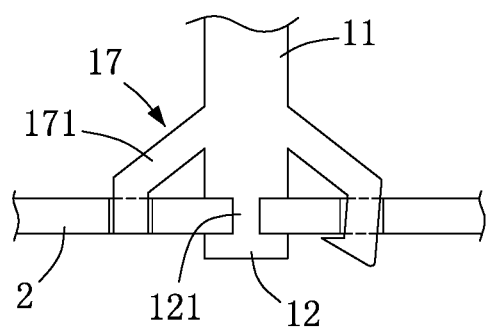
FIG. 24 is a schematic view of an engagement state after assembly according to the $14^{th}$ embodiment of the present disclosure.

Referring to FIG. 23 and FIG. 24, in a preferred embodiment of the present disclosure, the handle 1 has at least two engaging portions 17. In order for the handle 1 and the object 2 to be fitted together, the second engaging portions 12 are inserted into at least one insertion portion 21 of the object 2, and then the two engaging portions 17 are inserted into at least one snap engagement portion 25 of the object 2, so as to limit the lateral movement, vertical movement or rotational movement of the second engaging portions 12, or the two engaging portions 17 abut against or interfere with the surface of the object 2 to limit the lateral movement, vertical movement or rotational movement of the second engaging portions 12. Therefore, the handle 1 and the object 2 are firmly coupled together.

In a preferred embodiment of the present disclosure, the engaging portions 17 are in the number of four (the two pairs of engaging portions 17 flank each second engaging portion 12), and the snap engagement portions 25 correspond in quantity to the engaging portions 17. Therefore, the handle 1 and the object 2 are firmly coupled together.

In a preferred embodiment of the present disclosure, the engaging portions 17 are each a resilient clip with a resilient engaging arm 171. Therefore, the engaging portions 17 are engaged with the snap engagement portion 25 through the resilient engaging arms 171. Therefore, the handle 1 and the object 2 are firmly coupled together.

In a preferred embodiment of the present disclosure, the snap engagement portion 25 is in communication with the snap-engaging portion 22. Alternatively, the snap engagement portion 25 is not in communication with the snap-engaging portion 22. Therefore, the present disclosure meets practical needs.

Figure 25:
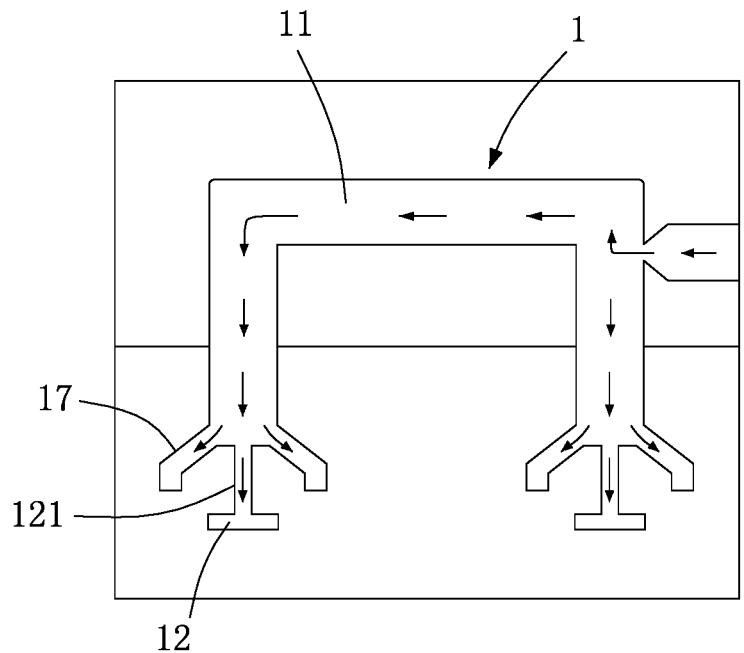
FIG. 25 is a schematic view of an assembly state of the $15^{th}$ embodiment of the present disclosure.

Referring to FIG. 25, in a preferred embodiment of the present disclosure, the body portion 11, second engaging portions 12, neck portions 121 and engaging portions 17 are formed by plastic in-mold injection molding. Therefore, the present disclosure meets practical needs.

Figure 26:
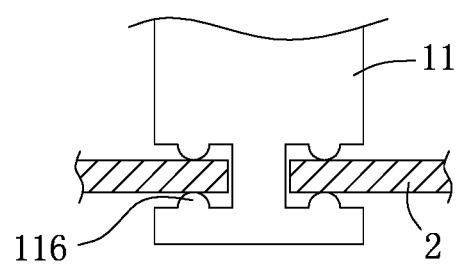
FIG. 26 is a schematic view of an assembly state of the $16^{th}$ embodiment of the present disclosure.

Referring to FIG. 26, in a preferred embodiment of the present disclosure, the body portion 11 (or second engaging portions 12) has an interfering portion 116 for interfering with or resisting the object 2. Therefore, the handle 1 and the object 2 are firmly coupled together.

Figure 27:
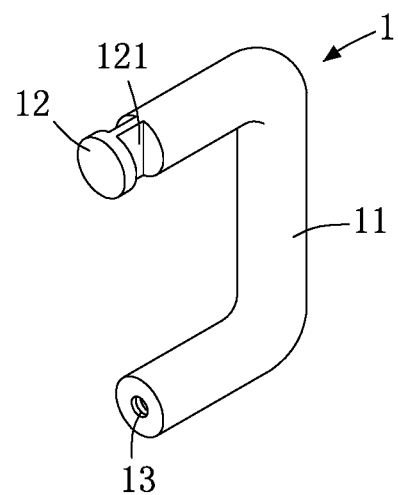
FIG. 27 is a perspective view of the $17^{th}$ embodiment of the present disclosure.

Referring to FIG. 27, in a preferred embodiment of the present disclosure, the second engaging portion 12 is disposed at one end of the body portion 11 and has a flattened neck portion 121 adapted to be inserted into, fitted to or snap-engaged with the object 2. The neck portion 121 is provided in the form of two notches, one notch or a cylinder smaller than the body portion or second engaging portion. Therefore, the present disclosure meets practical needs.

Figure 28:
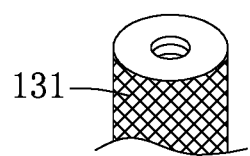
FIG. 28 is a schematic view of a connecting portion in different forms.
Figure 28:
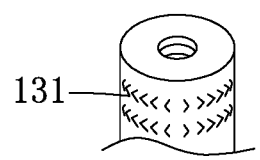
Figure 28:
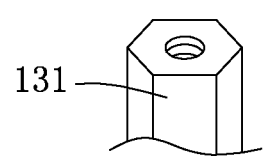

Referring to FIG. 28, in a preferred embodiment of the present disclosure, the surface of the connecting portion 13 has a rotation-preventing portion 131 adapted for prevention of the separation or rotation of the connecting portion 13 otherwise fitted to the body portion 11. The rotation-preventing portion 131 is an embossed pattern (indicated by part a in FIG. 28), dentate pattern (indicated by part b in FIG. 28), polygon (indicated by part c in FIG. 28), protrusion, dent, flat surface portion, arcuate surface portion, curved surface portion, section portion, slot portion or hole portion. Therefore, the present disclosure meets practical needs.

Figure 29:
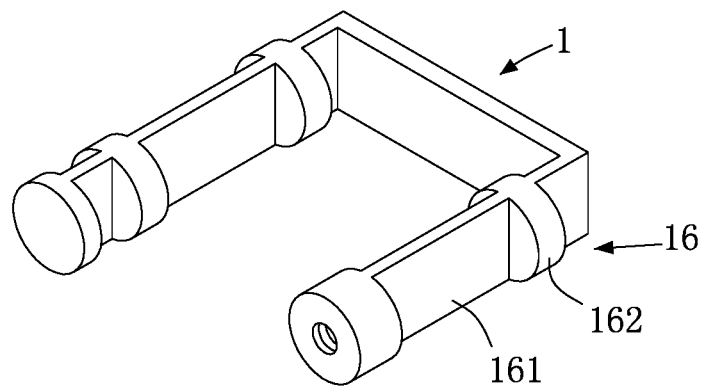
FIG. 29 is a perspective view of the $18^{th}$ embodiment of the present disclosure

Referring to FIG. 29, in a preferred embodiment of the present disclosure, the anti-slip portion 16 is a dent 161 or a protrusion 162 whereby during a plastic injection molding process performed to produce the handle 1 the surface thereof is prevented from contracting or sagging. Therefore, the present disclosure meets practical needs.

In a preferred embodiment of the present disclosure, the body portion 11 or the second engaging portion 12 has an electroplating layer. The electroplating layer is a zinc-plated layer, nickel-plated layer, tin-plated layer, chromium-plated layer, anode layer or copper-plated layer. During a manufacturing process, the body portion 11 or the second engaging portion 12 is immersed in a conduction solution 8, such that the material of the electroplating layer attaches to the body portion 11 or the second engaging portion 12 through the conduction solution 8. The body portion 11, the second engaging portion 12, the conduction solution or the electroplating layer material are capable of conducting an electrical current to allow the electroplating layer to move and attach to the body portion 11 or the second engaging portion 12. Therefore, the electroplating layer serves to protect the body portion 11 or the second engaging portion 12 and thereby extend the service life of the body portion 11 or the second engaging portion 12.

The body portion 11 or the second engaging portion 12 is made of a metallic material, non-metallic material or plastic material. The body portion 11 or the second engaging portion 12 has a baking varnish layer, plastic color sheath or plastic layer (not shown) for serving to protect the body portion 11 or the second engaging portion 12 and extend the service life of the body portion 11 or the second engaging portion 12, so as to meet the needs in different usage situations.

In a preferred embodiment of the present disclosure, the body portion 11 or the second engaging portion 12 has a dustproof layer. During a manufacturing process, the body portion 11 or the second engaging portion 12 is immersed in a conduction solution, whereas the dustproof layer material attaches to the body portion 11 or the second engaging portions 12 through the conduction solution. The body portion 11, the second engaging portions 12, the conduction solution 8 and the dustproof layer material are capable of conducting an electrical current, thereby allowing the electroplating layer material 80a to move and attach to the body portion 11 or the second engaging portion 12. Therefore, the electroplating layer serves to protect the body portion 11 or the second engaging portion 12 and extend the service life of the body portion 11 or the second engaging portion 12.

Figure 30:
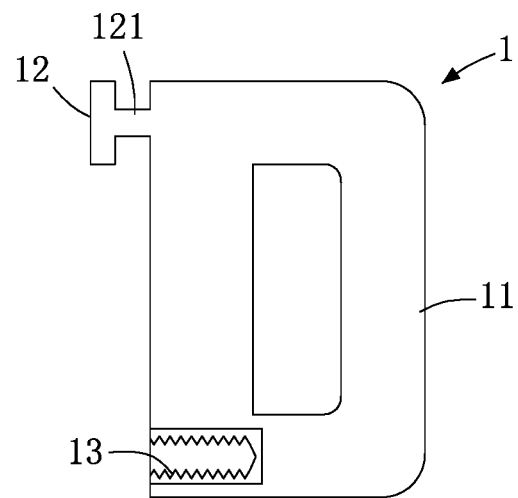
FIG. 30 is a perspective view of the $19^{th}$ embodiment of the present disclosure.

Referring to FIG. 30, in a preferred embodiment of the present disclosure, the body portion 11 of the handle 1 is ring-shaped, whereas the second engaging portion 12 and the connecting portion are disposed on one side of the body portion 11. Therefore, the present disclosure meets practical needs.

Figure 31:
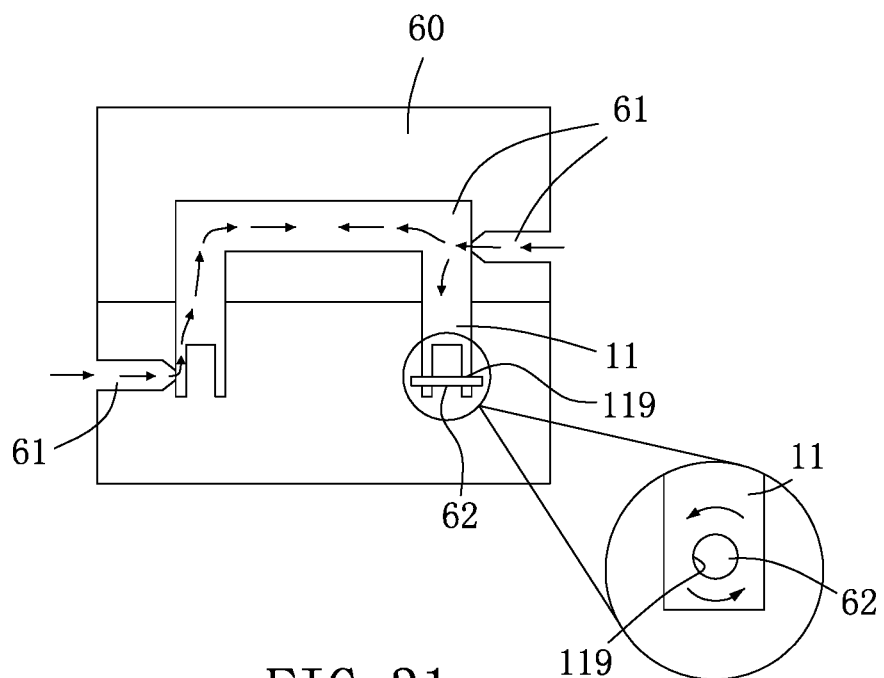
FIG. 31 is a perspective view of the $20^{th}$ embodiment of the present disclosure.

Referring to FIG. 31, in a preferred embodiment of the present disclosure, the body portion 11 is formed by plastic or metal injection molding in a die. The die has a sprue 61. Molten plastic or metal enters the die through the sprue 61 and then forms the body portion 11 by solidification and molding. Therefore, the present disclosure meets the actual manufacturing needs.

In a preferred embodiment of the present disclosure, the die has a sprue 61 and a limiting portion 62. Molten plastic or metal enters the die through the sprue portion 61 and then circumvents the limiting portion 62 to form a penetrable portion 119 (shown in the inset of FIG. 31) of the body portion 11 by solidification and molding.

Figure 32:
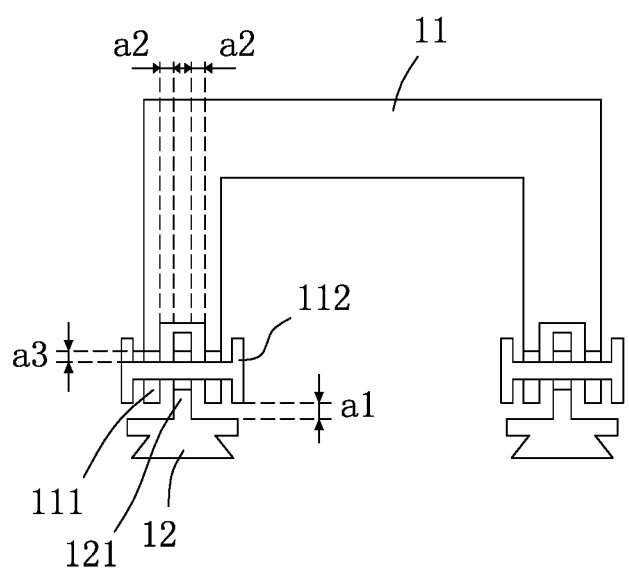
FIG. 32 is a perspective view of the $21^{st}$ embodiment of the present disclosure.
Figure 33:
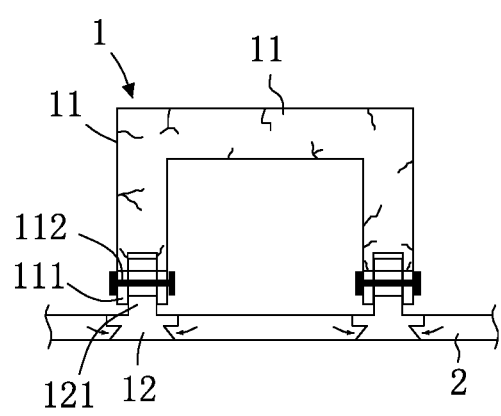
FIG. 33 is a schematic view of a state of absence of a floating level.
Figure 33:
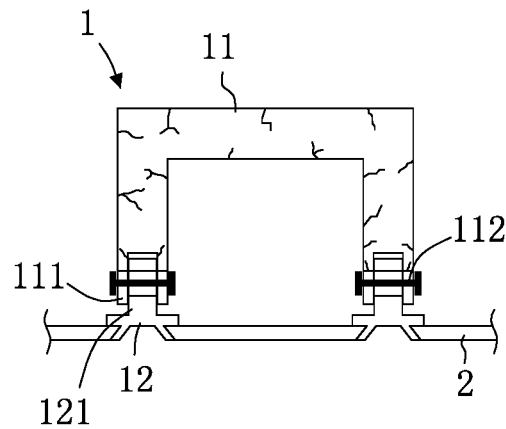
Figure 33:
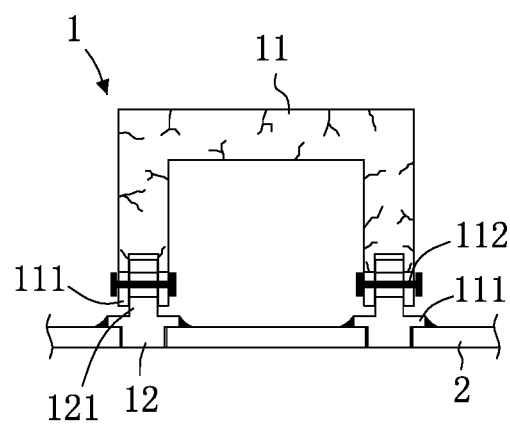
Figure 33:
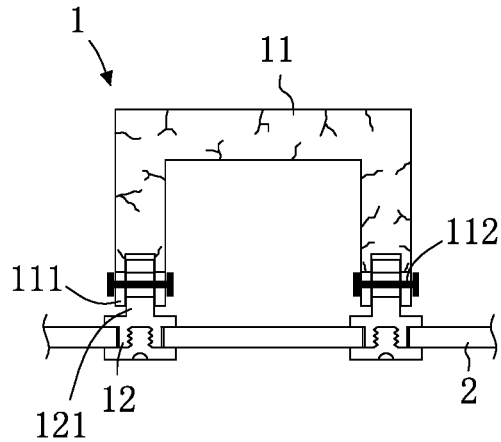

Referring to FIG. 32 and FIG. 33, in a preferred embodiment of the present disclosure, a floating level a1 exists between the body portion 11 and the first engaging portion 111, a floating level a2 exists between the body portion 11 and the fitting member 112, and a floating level a3 exists between the first engaging portion 111 and the fitting member 112. In practice, the floating level a1 exists between the body portion 11 and the first engaging portion 111. Alternatively, the floating level a2 exists between the body portion 11 and the fitting member 112. Alternatively, the floating level a3 exists between the first engaging portion 111 and the fitting member 112. In this embodiment, the first engaging portions 111 are in the number of two, and the floating levels a1, a2, a3 exist between the body portion 11 and the first engaging portion 111, between the body portion 11 and the fitting member 112, and between the first engaging portion 111 and the fitting member 112. The floating levels a1, a2, a3 range from 0.0001 mm to 100 mm.

To meet practical usage needs, a floating level (not shown) exists between the first engaging portion 111 and the second engaging portion 12. Alternatively, the floating level exists between the second engaging portion 12 and the fitting member 2.

The first engaging portion 111 and the object 2 are fitted together by riveting, expanded connection, welding or fastening, as needed.

In this embodiment, when the first engaging portion 111 and the object 2 are fitted together, the floating levels a1, a2, a3 provide the movement allowance between the body portion 11, the first engaging portion 111 and the fitting member 112 to prevent the body portion 11 from getting damaged or malfunctioning.

For instance, when the first engaging portion 111 and the object 2 are fitted together, the absence of the floating levels (shown in a-d of FIG. 33) causes an overly small tolerance between the first engaging portion 111 and the object 2 fitted together, and in consequence the fitting process is flawed by pulling, twisting, interference, squeezing, stress concentration or stress pulling. As a result, the body portion 11 made of a plastic or metal material ruptures, severs, deforms, interferes, jams, lags, has its movement restricted, has its function deteriorated or loses its function (shown in a-d of FIG. 33).

According to the present disclosure, the floating levels a1, a2, a3 exist between the body portion 11, the first engaging portion 111 and the fitting member 112 to provide thereto the movement allowance. Thus, according to the present disclosure, the first engaging portion 111 and the object 2 are fitted together to effectively avoid the aforesaid events (a~d in FIG. 33).

In a preferred embodiment of the present disclosure, the floating levels a1, a2, a3 allow the material snap-engagement portion of the first engaging portion 111 to be inserted into hole portions (for example, insertion portions or any other penetrating holes) of the object 2 within the floating ranges of the floating level a1, a2, a3 so as to be connected to the object 2.

Figure 34:
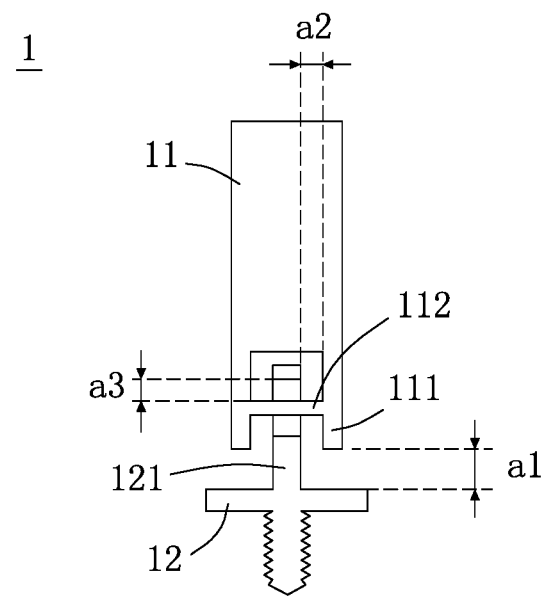
FIG. 34 is a perspective view of the $22^{nd}$ embodiment of the present disclosure.
Figure 35:
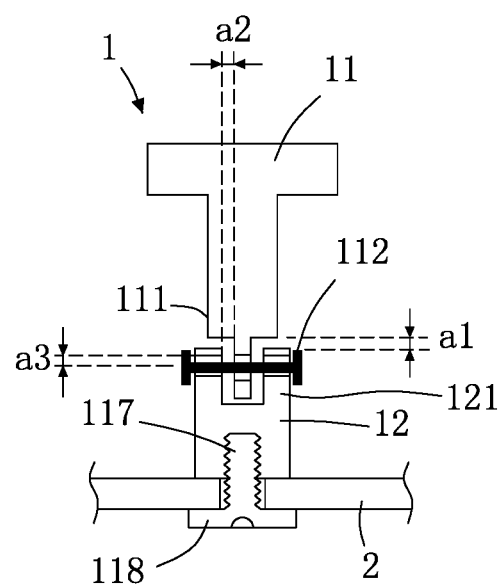
FIG. 35 is a perspective view of the $23^{rd}$ embodiment of the present disclosure.
Figure 36:
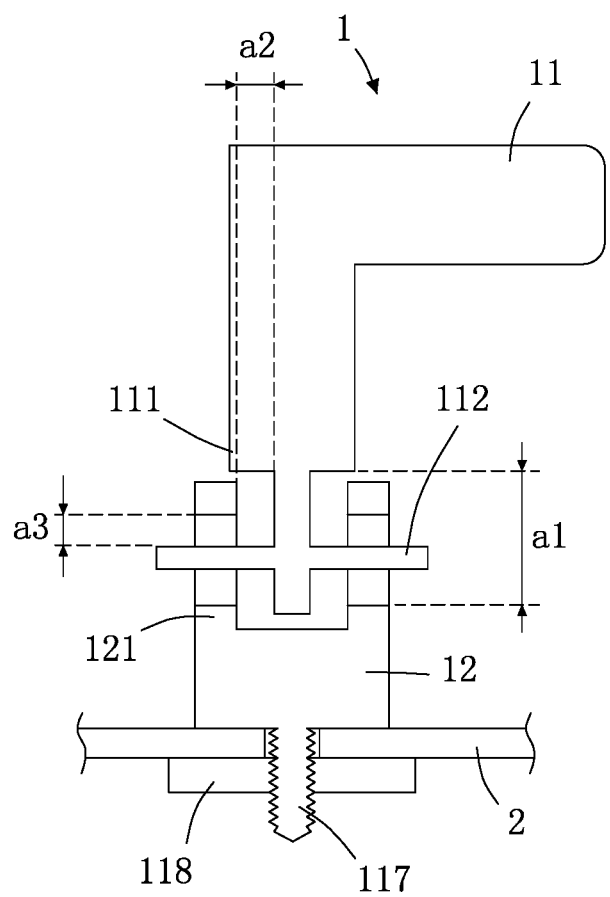
FIG. 36 is a perspective view of the $24^{th}$ embodiment of the present disclosure.

Referring to FIG. 34 through FIG. 36, in a preferred embodiment of the present disclosure, the body portion 11 of the handle 1 is slender (shown in FIG. 34), T-shaped (shown in FIG. 35) or L-shaped (shown in FIG. 36), and, in each embodiment, the first engaging portion 111 is in the number of one, and the floating levels a1, a2, a3 exist between the body portion 11 and the first engaging portion 111, between the body portion 11 and the fitting member 112, and between the first engaging portion 111 and the fitting member 112, respectively. As shown in FIG. 35 and FIG. 36, the first engaging portion 111 has a connecting portion 117 connected to a corresponding connecting portion 118. The connecting portion 117 and the corresponding connecting portion 118 clamp the object 2, thereby allowing the first engaging portion 111 and the object 2 to be fitted together. Therefore, the present disclosure meets practical needs.

Figure 37:
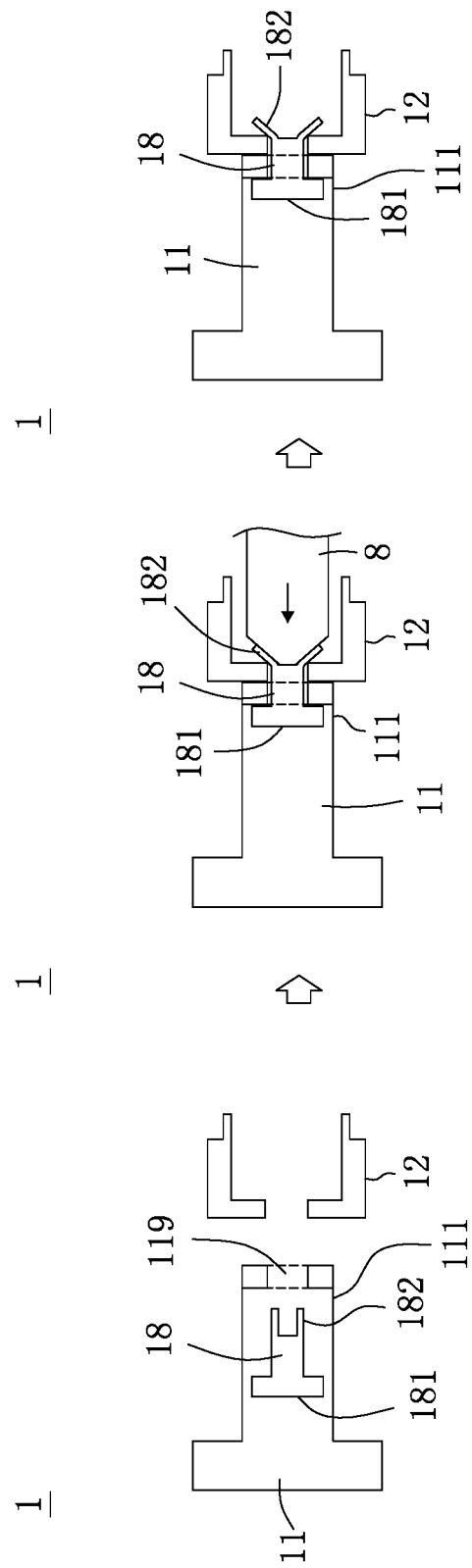
FIG. 37 is a schematic view of an assembly state of the $25^{th}$ embodiment of the present disclosure.

Referring to FIG. 37, in a preferred embodiment of the present disclosure, the handle 1 has an engaging portion. Its body portion 11 and second engaging portion 12 are fitted together by a fitting member 18 therebetween. The body portion 11 has a penetrable portion 119. The fitting member 18 has a head portion 181 and an expanded connection portion 182. The fitting member 18 is penetratingly disposed at the penetrable portion 119 of the body portion 11 and the second engaging portion 12. The head portion 181 abuts against the body portion 11. After deforming under an external force exerted by a tool 8, the expanded connection portion 182 is disposed at the second engaging portion 12 and abuts against the second engaging portion 12, thereby allowing the body portion 11 and the second engaging portion 12 to be fitted together by the fitting member 18. Therefore, the present disclosure meets practical needs.

Figure 38:
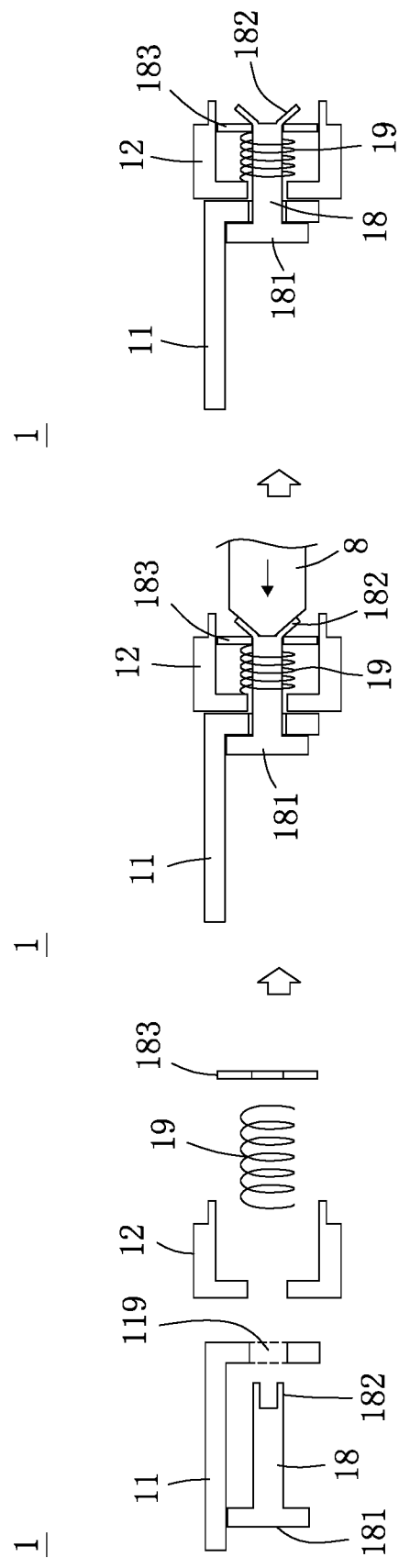
FIG. 38 is a schematic view of an assembly state of the $26^{th}$ embodiment of the present disclosure.

Referring to FIG. 38, in a preferred embodiment of the present disclosure, the handle 1 has an engaging portion. Its body portion 11 and second engaging portion 12 are fitted together by the fitting member 18 therebetween. The body portion 11 has a penetrable portion 119. The fitting member 18 has a head portion 181, an expanded connection portion 182 and a resist portion 183. The fitting member 18 is penetratingly disposed at the penetrable portion 119 of the body portion 11 and the second engaging portion 12. The head portion 181 abuts against the body portion 11. The resist portion 183 is fitted to the expanded connection portion 182. After deforming under an external force exerted by the tool 8, the expanded connection portion 182 abuts against the resist portion 183, whereas the expanded connection portion 182 and the resist portion 183 are disposed at the second engaging portion. Therefore, the present disclosure meets practical needs.

In a preferred embodiment of the present disclosure, the handle 1 further comprises a resilient component 19. The fitting member 18 penetrates the resilient component 19 in the second engaging portion 12. A resist portion 183 is disposed at the fitting member 18. One end of the resilient component 19 abuts against one side in the second engaging portion 12. The other end of the resilient component 19 abuts against the resist portion 183. Therefore, the present disclosure meets practical needs.

Figure 39:
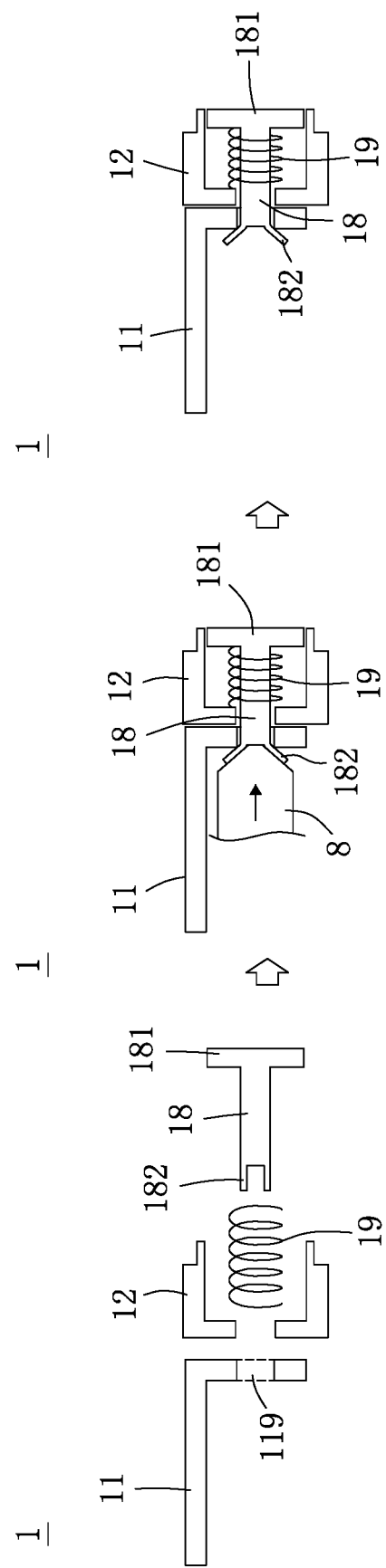
FIG. 39 is a schematic view of an assembly state of the $27^{th}$ embodiment of the present disclosure.

Referring to FIG. 39, in a preferred embodiment of the present disclosure, the handle 1 has an engaging portion. Its body portion 11 and second engaging portion 12 are fitted together by the fitting member 18 therebetween. The body portion 11 has a penetrable portion 119. The fitting member 18 has a head portion 181 and an expanded connection portion 182. The fitting member 18 is penetratingly disposed at the penetrable portion 119 of the body portion 11 and the second engaging portion 12. After deforming under an external force exerted by the tool 8, the expanded connection portion 182 abuts against the body portion 11, whereas the head portion 181 is disposed at the second engaging portion 12. Therefore, the present disclosure meets practical needs.

In a preferred embodiment of the present disclosure, the handle 1 further comprises a resilient component 19 with one end abutting against the second engaging portion 12 and the other end abutting against the head portion 181. Therefore, the present disclosure meets practical needs.

Figure 40:
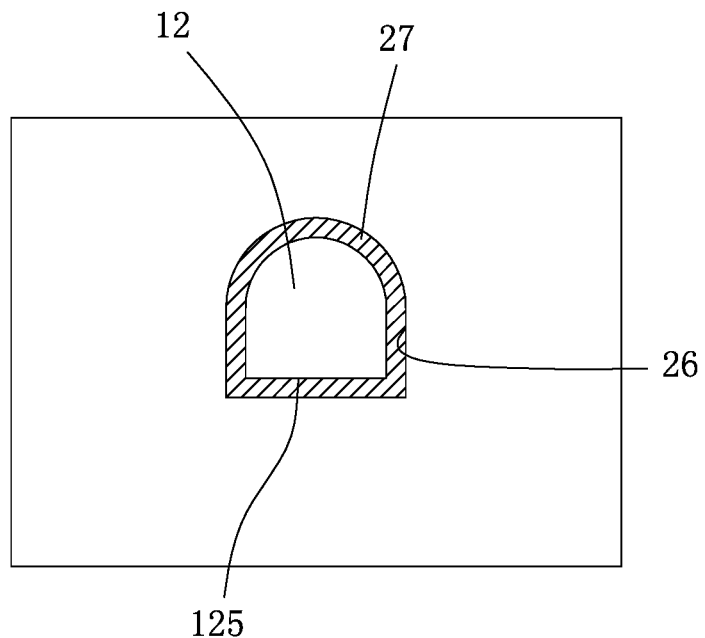
FIG. 40 is a schematic view of an assembly state of the $28^{th}$ embodiment of the present disclosure.

Referring to FIG. 40, in a preferred embodiment of the present disclosure, the second engaging portion 12 has a rotation-preventing portion 125, whereas the object 2 has a corresponding rotation-preventing portion 26 for correspondingly preventing the rotation of the second engaging portion 12, fixing the orientation of the second engaging portion 12, or fixing the position of the second engaging portion 12 relative to the object 2, so as for the second engaging portion 12 to be firmly fitted to the object 2.

In a preferred embodiment of the present disclosure, a solder layer 27 is disposed between the second engaging portion 12 and the object 2 and adapted to be heated and then cooled to solidify. The solder layer 27 fixedly connects the second engaging portion 12 and the object 2, thereby allowing the second engaging portion 12 to be firmly fitted to the object 2. The object 2 is a printed circuit board (PCB).

In a preferred embodiment of the present disclosure, after being squeezed, the material of the object 2 flows into or enters, or is squeezed into the second engaging portion 12, thereby allowing the second engaging portion 12 to be firmly fitted to the object 2.

Figure 41:
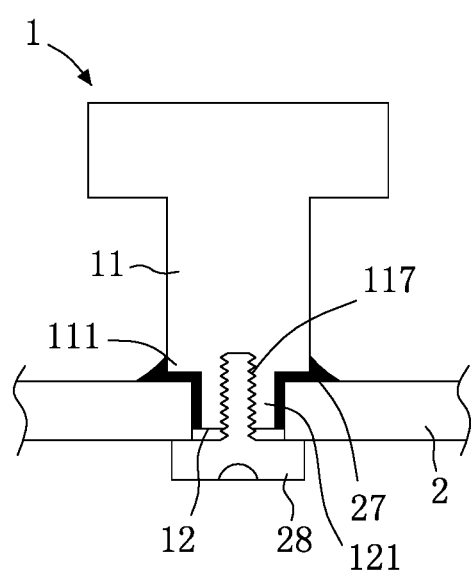
FIG. 41 is a schematic view of an assembly state of the $29^{th}$ embodiment of the present disclosure.

Referring to FIG. 41, in a preferred embodiment of the present disclosure, the handle 1 further comprises a corresponding connection portion 28. The corresponding connection portion 28 engages with the connecting portion 117 and abuts against the object 2 to prevent rotation and then clamps, jointly with the body portion 11, the object 2. Alternatively, a welding process is carried out with the solder layer 27, allowing the handle 1 and the body portion 11 to clamp the object 2. Alternatively, a welding process is carried out with the solder layer 27 to prevent rotation, such that the handle 1 and the body portion 11 clamp the object 2, allowing the handle 1 to be firmly fitted to the object 2.

Figure 42:
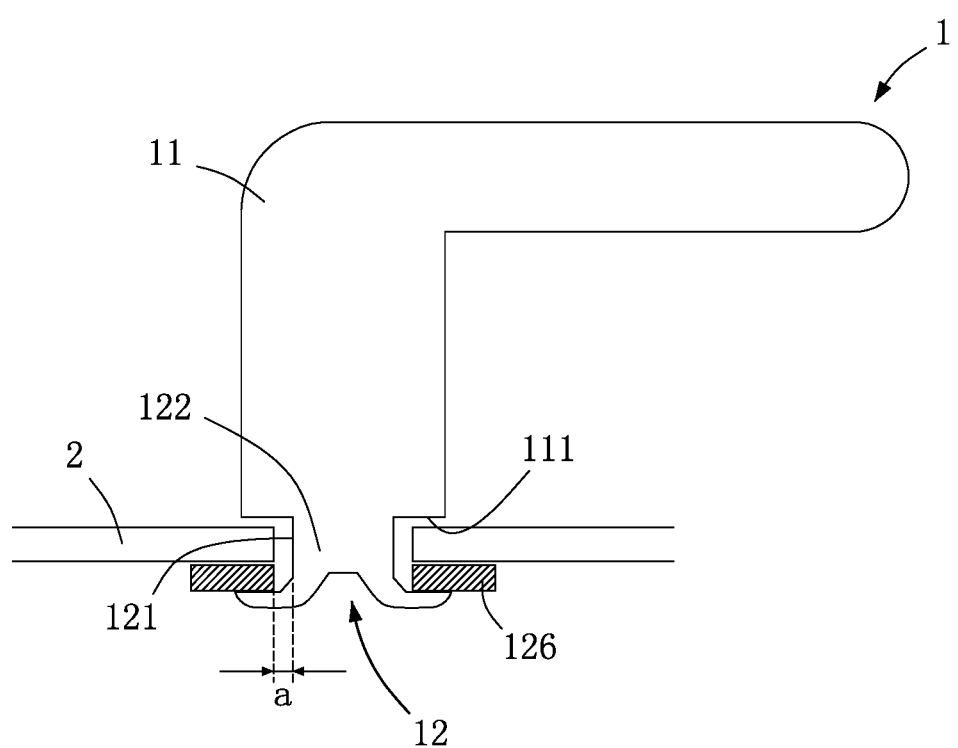
FIG. 42 is a schematic view of an assembly state of the $30^{th}$ embodiment of the present disclosure.

Referring to FIG. 42, in a preferred embodiment of the present disclosure, the second engaging portion 12 forms the neck portion 121 under an external force. The neck portion 121 is a material snap-engagement portion adapted to be snap-engaged with a blocking element 126 to stop the object 2 and thereby fit to the object 2. The second engaging portion 12 and the object 2 are fitted together. A floating level a exists between the second engaging portion 12 and the object 2. Therefore, the present disclosure meets practical needs.

In conclusion, it is an objective of the present disclosure to provide a handle having an engaging portion. Thus, the handle is mounted on the object in order to be in use and dismounted from the object when not in use. Therefore, the handle is not only easy to operate and use but is also not susceptible to collisions.

The above embodiments are not restrictive of the scope of the claims of the present disclosure.

While the present disclosure has been described by means of specific embodiments, numerous modifications and variations could be made thereto by those skilled in the art without departing from the scope and spirit of the present disclosure set forth in the claims.

What is claimed is:

1. A handle having an engaging portion, the handle comprising:
   a body portion having a first engaging portion; and
   a second engaging portion disposed at the body portion, having a neck portion, and adapted to be inserted into, fitted to or snap-engaged with an object,
   wherein the first engaging portion is fitted to, connected to, or integrally formed with the neck portion of the second engaging portion;
   wherein the first engaging portion and the second engaging portion are interconnected together by a fitting member extending therethrough, and a resist portion is disposed at the fitting member;
   a resilient component is disposed in the second engaging portion, wherein the fitting member penetrates through the resilient component in the second engaging portion, one end of the resilient component abuts against one side in the second engaging portion, and the other end of the resilient component abuts against the resist portion.

2. The handle having an engaging portion according to claim 1, wherein the fitting member has a head portion at one end and an expanded connection portion at an opposite end, the resist portion is disposed at the expanded connection portion, the head portion abuts against the first engaging portion, the expanded connection portion abuts against the resist portion, and the expanded connection portion and the resist portion are disposed at the second engaging portion.

3. The handle having an engaging portion according to claim 1, wherein the fitting member has a head portion at one end and an expanded connection portion at an opposite end, the fitting member is penetratingly disposed through the first engaging portion and the second engaging portion, the expanded connection portion abuts the first engaging portion, the head portion, comprising said resist portion, is disposed at the second engaging portion.

4. The handle having an engaging portion according to claim 1, wherein the first engaging portion has a penetrable portion, and the fitting member is penetratingly disposed through the penetrable portion, so as to interconnect the first engaging portion and the second engaging portion together.

\* \* \* \* \*